United States Patent
Tiirola et al.

(10) Patent No.: US 10,225,826 B2
(45) Date of Patent: Mar. 5, 2019

(54) TRANSMISSION OF UPLINK CONTROL INFORMATION FOR MULTIPLE CONTROL CHANNEL FORMAT LENGTHS

(71) Applicant: NOKIA TECHNOLOGIES OY, Espoo (FI)

(72) Inventors: Esa Tapani Tiirola, Kempele (FI); Kari Juhani Hooli, Oulu (FI); Sigen Ye, Whitehouse Station, NJ (US)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 15/469,386

(22) Filed: Mar. 24, 2017

(65) Prior Publication Data

US 2018/0279291 A1 Sep. 27, 2018

(51) Int. Cl.
*H04W 72/04* (2009.01)
*H04L 1/18* (2006.01)
*H04B 1/709* (2011.01)

(52) U.S. Cl.
CPC ........ *H04W 72/0413* (2013.01); *H04B 1/709* (2013.01); *H04L 1/1861* (2013.01)

(58) Field of Classification Search
CPC ... H04B 1/709; H04L 1/1861; H04W 72/0413
See application file for complete search history.

(56) References Cited

U.S. PATENT DOCUMENTS

| | | | | |
|---|---|---|---|---|
| 8,976,745 B2* | 3/2015 | Kwon | ................... | H04L 1/0026 |
| | | | | 370/329 |
| 9,042,299 B2* | 5/2015 | Kishiyama | ............ | H04J 13/004 |
| | | | | 370/328 |
| 9,131,491 B2* | 9/2015 | Lee | ...................... | H04W 72/042 |
| 9,300,455 B2* | 3/2016 | Kim | ........................ | H04B 1/69 |
| 9,320,027 B2* | 4/2016 | Chung | ............. | H04W 72/0413 |
| 9,647,741 B2* | 5/2017 | Zhang | .................. | H04B 7/0613 |
| 9,955,356 B2* | 4/2018 | Xiong | ..................... | H04W 4/70 |

(Continued)

OTHER PUBLICATIONS

"Zadoff-Chu sequence", retrieved from: https://en.wikipedia.org/wiki/Zadoff%E2%80%93Chu_sequence, on Mar. 17, 2017, 3 pages.

(Continued)

*Primary Examiner* — Steven H Nguyen
(74) *Attorney, Agent, or Firm* — Brake Hughes Bellermann LLP

(57) ABSTRACT

A technique includes multiplying, by a user device, a first uplink control information, associated with a first control channel format length, with a first orthogonal signal to obtain a first spread control signal, multiplying, by the user device, a second uplink control information, associated with a second control channel format length, with a second orthogonal signal that is different than the first orthogonal signal to obtain a second spread control signal, the second control channel format length being different than the first control channel format length, receiving, by the user device, a first resource grant indicating one or more resource blocks for uplink transmission, the first resource grant associated with or provided for the first uplink control information, and transmitting, by the user device, at least partially simultaneously via the one or more resource blocks, the first spread control signal and the second spread control signal.

20 Claims, 11 Drawing Sheets

(56) References Cited

U.S. PATENT DOCUMENTS

| | | | | |
|---|---|---|---|---|
| 2003/0214935 A1* | 11/2003 | Khan | H04L 1/1628 | 370/349 |
| 2006/0282740 A1* | 12/2006 | Gu | H04L 1/06 | 714/749 |
| 2007/0183384 A1* | 8/2007 | Kwak | H04L 5/0055 | 370/338 |
| 2008/0310547 A1 | 12/2008 | Tiirola et al. | | |
| 2009/0201869 A1* | 8/2009 | Xu | H04L 1/1671 | 370/329 |
| 2009/0316811 A1* | 12/2009 | Maeda | H04W 76/11 | 375/260 |
| 2011/0110246 A1* | 5/2011 | Damnjanovic | H04L 1/0028 | 370/252 |
| 2011/0170495 A1* | 7/2011 | Earnshaw | H04W 72/02 | 370/329 |
| 2012/0044871 A1* | 2/2012 | Li | H04L 1/1854 | 370/328 |
| 2012/0155413 A1* | 6/2012 | Liu | H04L 1/1861 | 370/329 |
| 2013/0010721 A1* | 1/2013 | Aiba | H04L 1/1812 | 370/329 |
| 2013/0288738 A1* | 10/2013 | Takeda | H04L 1/1825 | 455/522 |
| 2013/0343322 A1* | 12/2013 | Lee | H04B 7/2656 | 370/329 |
| 2014/0301338 A1* | 10/2014 | Zhong | H04L 5/0037 | 370/329 |
| 2014/0328293 A1* | 11/2014 | Seo | H04L 1/1861 | 370/329 |
| 2016/0094996 A1* | 3/2016 | Xiong | H04W 4/70 | 370/329 |
| 2016/0226644 A1* | 8/2016 | Gaal | H04W 72/0413 | |
| 2017/0223695 A1* | 8/2017 | Kwak | H04W 56/0075 | |
| 2017/0251464 A1* | 8/2017 | Mukherjee | H04W 72/0413 | |
| 2018/0102877 A1* | 4/2018 | Jiang | H04L 1/0003 | |
| 2018/0124815 A1* | 5/2018 | Papasakellariou | H04W 72/1268 | |
| 2018/0132232 A1* | 5/2018 | Aiba | H04W 76/20 | |
| 2018/0132264 A1* | 5/2018 | Jung | H04W 72/1268 | |
| 2018/0139773 A1* | 5/2018 | Ma | H04W 72/0453 | |

OTHER PUBLICATIONS

"Discussion on URLLC support in NR", R1-166759, 3GPP TSG RAN WG1 Meeting #86, Gothenburg, Sweden, Aug. 22-26, 2016, 5 pages.

"SPUCCH Design for shortened TTI", R1-1702000, 3GPP TSG-RAN WG1 Meeting #88, Athens, Greece, Feb. 13-17, 2017, 7 pages.

"Multiplexing eMBB and URLLC UL control channels", R1-1702351, 3GPP TSG RAN WG1 NR Ad Hoc Meeting, Athens, Greece Feb. 13-17, 2017, 3 pages.

* cited by examiner

TRANSMISSION OF UPLINK CONTROL INFORMATION FOR MULTIPLE CONTROL CHANNEL FORMAT LENGTHS

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

SUMMARY

According to an example implementation, a method is provided of parallel transmission of uplink control information in a wireless network. The method includes multiplying, by a user device, a first uplink control information, associated with a first control channel format length, with a first orthogonal signal to obtain a first spread control signal; multiplying, by the user device, a second uplink control information, associated with a second control channel format length, with a second orthogonal signal that is different than the first orthogonal signal to obtain a second spread control signal, the second control channel format length being different than the first control channel format length; receiving, by the user device, a first resource grant indicating one or more resource blocks for uplink transmission, the first resource grant associated with or provided for the first uplink control information; transmitting, by the user device, at least partially simultaneously via the one or more resource blocks, the first spread control signal and the second spread control signal.

According to an example implementation, an apparatus includes at least one processor and at least one memory including computer instructions, when executed by the at least one processor, cause the apparatus to: multiply, by a user device, a first uplink control information, associated with a first control channel format length, with a first orthogonal signal to obtain a first spread control signal; multiply, by the user device, a second uplink control information, associated with a second control channel format length, with a second orthogonal signal that is different than the first orthogonal signal to obtain a second spread control signal, the second control channel format length being different than the first control channel format length; receive, by the user device, a first resource grant indicating one or more resource blocks for uplink transmission, the first resource grant associated with or provided for the first uplink control information; and transmit, by the user device, at least partially simultaneously via the one or more resource blocks, the first spread control signal and the second spread control signal.

According to an example implementation, an apparatus includes means for multiplying, by a user device, a first uplink control information, associated with a first control channel format length, with a first orthogonal signal to obtain a first spread control signal; means for multiplying, by the user device, a second uplink control information, associated with a second control channel format length, with a second orthogonal signal that is different than the first orthogonal signal to obtain a second spread control signal, the second control channel format length being different than the first control channel format length; means for receiving, by the user device, a first resource grant indicating one or more resource blocks for uplink transmission, the first resource grant associated with or provided for the first uplink control information; and means for transmitting, by the user device, at least partially simultaneously via the one or more resource blocks, the first spread control signal and the second spread control signal.

According to an example implementation, a computer program product includes a computer-readable storage medium and storing executable code that, when executed by at least one data processing apparatus, is configured to cause the at least one data processing apparatus to perform a method including: multiplying, by a user device, a first uplink control information, associated with a first control channel format length, with a first orthogonal signal to obtain a first spread control signal; multiplying, by the user device, a second uplink control information, associated with a second control channel format length, with a second orthogonal signal that is different than the first orthogonal signal to obtain a second spread control signal, the second control channel format length being different than the first control channel format length; receiving, by the user device, a first resource grant indicating one or more resource blocks for uplink transmission, the first resource grant associated with or provided for the first uplink control information; transmitting, by the user device, at least partially simultaneously via the one or more resource blocks, the first spread control signal and the second spread control signal.

According to an example implementation, a method of parallel transmission of uplink control information is provided. The method includes multiplying, by a user device, a first uplink control information, associated with a first control channel format length and provided for a first data service type, with a first orthogonal signal to obtain a first spread control signal; multiplying, by the user device, a second uplink control information, associated with a second control channel format length and provided for a second data service type, with a second orthogonal signal that is different than the first orthogonal signal to obtain a second spread control signal, the second control channel format length being different than the first control channel format length and the second data service type being different than the first data service type; and transmitting, by the user device, at least partially simultaneously via one or more resource blocks, the first spread control signal and the second spread control signal.

According to an example implementation, an apparatus includes at least one processor and at least one memory including computer instructions, when executed by the at least one processor, cause the apparatus to: multiply, by a user device, a first uplink control information, associated with a first control channel format length and provided for a first data service type, with a first orthogonal signal to obtain a first spread control signal; multiply, by the user device, a second uplink control information, associated with a second control channel format length and provided for a second data service type, with a second orthogonal signal that is different than the first orthogonal signal to obtain a second spread control signal, the second control channel format length being different than the first control channel format length and the second data service type being different than the first data service type; and transmit, by the user device, at least partially simultaneously via one or more resource blocks, the first spread control signal and the second spread control signal.

According to an example implementation, an apparatus includes means for multiplying, by a user device, a first uplink control information, associated with a first control channel format length and provided for a first data service type, with a first orthogonal signal to obtain a first spread control signal; means for multiplying, by the user device, a second uplink control information, associated with a second control channel format length and provided for a second data service type, with a second orthogonal signal that is different than the first orthogonal signal to obtain a second spread control signal, the second control channel format length being different than the first control channel format length and the second data service type being different than the first data service type; and means for transmitting, by the user device, at least partially simultaneously via one or more resource blocks, the first spread control signal and the second spread control signal.

According to an example implementation, a computer program product includes a computer-readable storage medium and storing executable code that, when executed by at least one data processing apparatus, is configured to cause the at least one data processing apparatus to perform a method including: multiplying, by a user device, a first uplink control information, associated with a first control channel format length and provided for a first data service type, with a first orthogonal signal to obtain a first spread control signal; multiplying, by the user device, a second uplink control information, associated with a second control channel format length and provided for a second data service type, with a second orthogonal signal that is different than the first orthogonal signal to obtain a second spread control signal, the second control channel format length being different than the first control channel format length and the second data service type being different than the first data service type; and transmitting, by the user device, at least partially simultaneously via one or more resource blocks, the first spread control signal and the second spread control signal.

According to an example implementation, a method may include determining, by a user device in a wireless network, that a first uplink control information includes uplink data or uplink hybrid automatic repeat request (HARQ) feedback provided for a first data service type, the first uplink control information associated with a first control channel format length and provided for the first data service type; determining, by the user device, a second uplink control information associated with a second control channel format length and provided for a second data service type, the second control channel format length being different than the first control channel format length and the second data service type being different than the first data service type; dropping at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and, transmitting the second uplink control information, instead of the dropped portion of the first uplink control information during a first resource block.

According to an example implementation, an apparatus includes at least one processor and at least one memory including computer instructions, when executed by the at least one processor, cause the apparatus to: determine, by a user device in a wireless network, that a first uplink control information includes uplink data or uplink hybrid automatic repeat request (HARQ) feedback provided for a first data service type, the first uplink control information associated with a first control channel format length and provided for the first data service type; determine, by the user device, a second uplink control information associated with a second control channel format length and provided for a second data service type, the second control channel format length being different than the first control channel format length and the second data service type being different than the first data service type; drop at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and, transmit the second uplink control information, instead of the dropped portion of the first uplink control information during a first resource block.

According to an example implementation, an apparatus includes means for determining, by a user device in a wireless network, that a first uplink control information includes uplink data or uplink hybrid automatic repeat request (HARQ) feedback provided for a first data service type, the first uplink control information associated with a first control channel format length and provided for the first data service type; means for determining, by the user device, a second uplink control information associated with a second control channel format length and provided for a second data service type, the second control channel format length being different than the first control channel format length and the second data service type being different than the first data service type; means for dropping at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and, means for transmitting the second uplink control information, instead of the dropped portion of the first uplink control information during a first resource block.

According to an example implementation, a computer program product includes a computer-readable storage medium and storing executable code that, when executed by at least one data processing apparatus, is configured to cause the at least one data processing apparatus to perform a method including: determining, by a user device in a wireless network, that a first uplink control information includes uplink data or uplink hybrid automatic repeat request (HARQ) feedback provided for a first data service type, the first uplink control information associated with a first control channel format length and provided for the first data service type; determining, by the user device, a second uplink control information associated with a second control channel format length and provided for a second data service type, the second control channel format length being different than the first control channel format length and the second data service type being different than the first data service type; dropping at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and, transmitting the second uplink control information, instead of the dropped portion of the first uplink control information during a first resource block.

According to an example implementation, a method is provided for receiving a parallel transmission of uplink control information in a wireless network is, including: configuring, by a base station of a user device to: multiply, by the user device, a first uplink control information, associated with a first control channel format length, with a first orthogonal signal to obtain a first spread control signal; and multiply, by the user device, a second uplink control information, associated with a second control channel format length, with a second orthogonal signal that is different than the first orthogonal signal to obtain a second spread control signal, the second control channel format length being different than the first control channel format length; transmitting, by the base station to the user device, a first resource grant indicating one or more resource blocks for uplink transmission, the first resource grant associated with or provided for the first uplink control information; and receiving, by the base station from the user device, at least partially simultaneously via the one or more resource blocks, the first spread control signal and the second spread control signal.

According to an example implementation, an apparatus includes at least one processor and at least one memory including computer instructions, when executed by the at least one processor, cause the apparatus to: configure, by a base station of a user device to: multiply, by the user device, a first uplink control information, associated with a first control channel format length, with a first orthogonal signal to obtain a first spread control signal; and multiply, by the user device, a second uplink control information, associated with a second control channel format length, with a second orthogonal signal that is different than the first orthogonal signal to obtain a second spread control signal, the second control channel format length being different than the first control channel format length; transmit, by the base station to the user device, a first resource grant indicating one or more resource blocks for uplink transmission, the first resource grant associated with or provided for the first uplink control information; and receive, by the base station from the user device, at least partially simultaneously via the one or more resource blocks, the first spread control signal and the second spread control signal.

According to an example implementation, an apparatus includes means for configuring, by a base station of a user device to: multiply, by the user device, a first uplink control information, associated with a first control channel format length, with a first orthogonal signal to obtain a first spread control signal; and multiply, by the user device, a second uplink control information, associated with a second control channel format length, with a second orthogonal signal that is different than the first orthogonal signal to obtain a second spread control signal, the second control channel format length being different than the first control channel format length; means for transmitting, by the base station to the user device, a first resource grant indicating one or more resource blocks for uplink transmission, the first resource grant associated with or provided for the first uplink control information; and means for receiving, by the base station from the user device, at least partially simultaneously via the one or more resource blocks, the first spread control signal and the second spread control signal.

According to an example implementation, a computer program product includes a computer-readable storage medium and storing executable code that, when executed by at least one data processing apparatus, is configured to cause the at least one data processing apparatus to perform a method including: configuring, by a base station of a user device to: multiply, by the user device, a first uplink control information, associated with a first control channel format length, with a first orthogonal signal to obtain a first spread control signal; and multiply, by the user device, a second uplink control information, associated with a second control channel format length, with a second orthogonal signal that is different than the first orthogonal signal to obtain a second spread control signal, the second control channel format length being different than the first control channel format length; transmitting, by the base station to the user device, a first resource grant indicating one or more resource blocks for uplink transmission, the first resource grant associated with or provided for the first uplink control information; and receiving, by the base station from the user device, at least partially simultaneously via the one or more resource blocks, the first spread control signal and the second spread control signal.

According to an example implementation, a method includes configuring, by a base station of a user device to: determine, by the user device in a wireless network, that a first uplink control information includes uplink data or uplink hybrid automatic repeat request (HARQ) feedback provided for a first data service type, the first uplink control information associated with a first control channel format length and provided for the first data service type; determine, by the user device, a second uplink control information associated with a second control channel format length and provided for a second data service type, the second control channel format length being different than the first control channel format length and the second data service type being different than the first data service type; and drop at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and receiving, by the base station from the user device, the second uplink control information, instead of the dropped portion of the first uplink control information during a first resource block.

An apparatus includes at least one processor and at least one memory including computer instructions, when executed by the at least one processor, cause the apparatus to: configure, by a base station of a user device to: determine, by the user device in a wireless network, that a first uplink control information includes uplink data or uplink hybrid automatic repeat request (HARQ) feedback provided for a first data service type, the first uplink control information associated with a first control channel format length and provided for the first data service type; determine, by the user device, a second uplink control information associated with a second control channel format length and provided for a second data service type, the second control channel format length being different than the first control channel format length and the second data service type being different than the first data service type; and drop at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and receive, by the base station from the user device, the second uplink control information, instead of the dropped portion of the first uplink control information during a first resource block.

According to an example implementation, an apparatus includes means for configuring, by a base station of a user device to: determine, by the user device in a wireless network, that a first uplink control information includes uplink data or uplink hybrid automatic repeat request (HARQ) feedback provided for a first data service type, the first uplink control information associated with a first control channel format length and provided for the first data service type; determine, by the user device, a second uplink control information associated with a second control channel format length and provided for a second data service type, the second control channel format length being different than the first control channel format length and the second data service type being different than the first data service type; and drop at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and means for receiving, by the base station from the user device, the second uplink control information, instead of the dropped portion of the first uplink control information during a first resource block.

According to an example implementation, a computer program product includes a computer-readable storage medium and storing executable code that, when executed by at least one data processing apparatus, is configured to cause the at least one data processing apparatus to perform a method including: configuring, by a base station of a user device to: determine, by the user device in a wireless network, that a first uplink control information includes uplink data or uplink hybrid automatic repeat request (HARQ) feedback provided for a first data service type, the first uplink control information associated with a first control channel format length and provided for the first data service type; determine, by the user device, a second uplink control information associated with a second control channel format length and provided for a second data service type, the second control channel format length being different than the first control channel format length and the second data service type being different than the first data service type; and drop at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and receiving, by the base station from the user device, the second uplink control information, instead of the dropped portion of the first uplink control information during a first resource block.

The details of one or more examples of implementations are set forth in the accompanying drawings and the description below. Other features will be apparent from the description and drawings, and from the claims.

DETAILED DESCRIPTION

Figure 1:
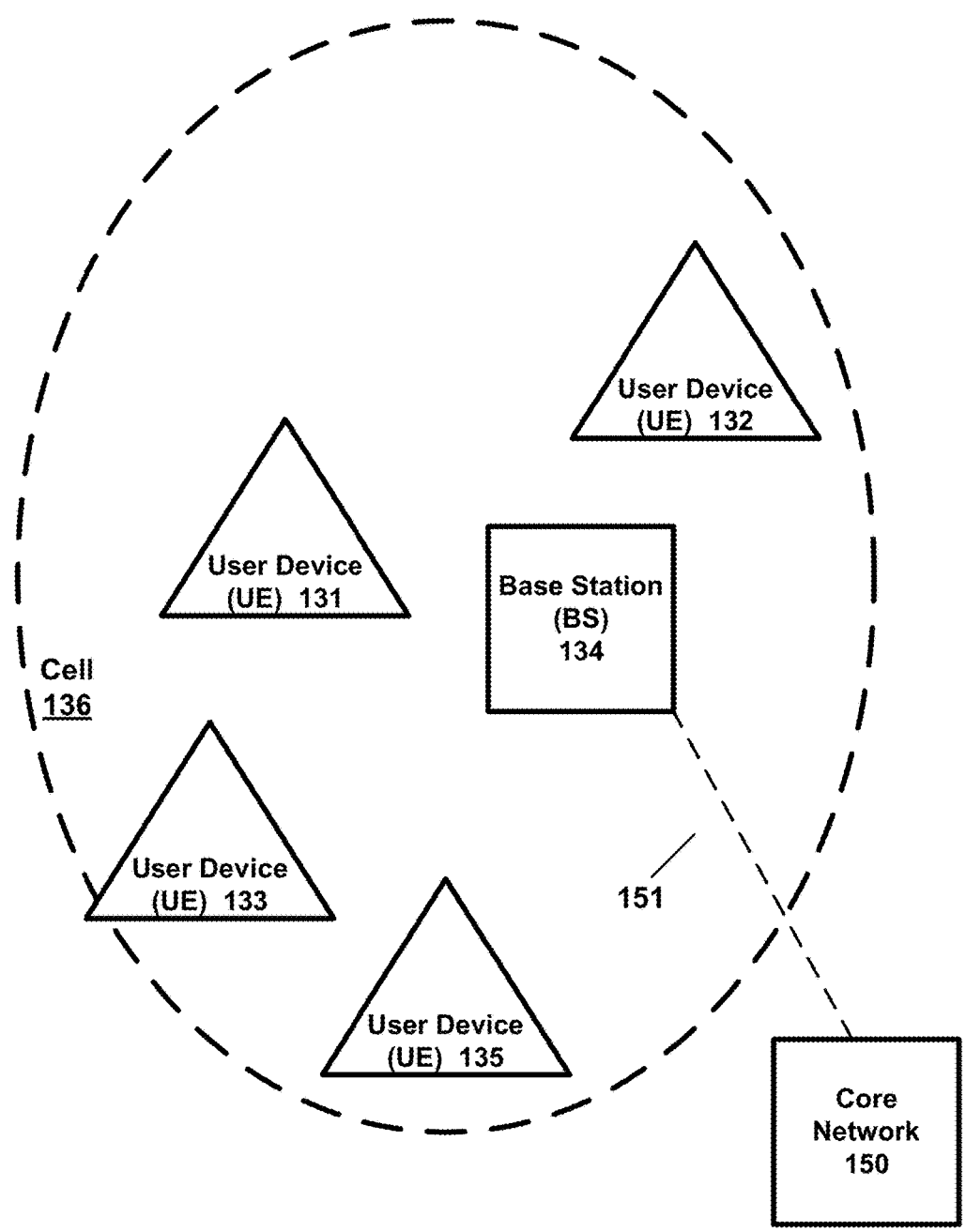
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

As noted, different data service types (or different types of UEs) may have different performance requirements, such as for reliability (e.g., maximum block error rate), bandwidth or data throughput or minimum data rate, and latency. Some data service types, such as eMBB, may require higher data rates, while tolerating higher block error rates and higher latency (as compared to URLLC). On the other hand, some high reliability data service types, such as URLLC, may require much higher reliability (e.g., lower block error rates) and lower latency, as compared to eMBB. On the other hand, they may operate with relatively small transport blocks sizes (i.e. smaller data throughput) compared to typical eMBB services.

By way of illustrative example, a user device (or UE) may send and/or receive mixed data traffic, or send and/or receive data of multiple data service types. For example, a UE may include two applications running thereon, including: 1) a URLLC application (e.g., an autonomous or self-driving car related application) that requires high reliability/low latency services and 2) an eMBB application (e.g., web browser, email application, social media application) that does not require high reliability/low latency services. It may be desirable, at least in some cases, to perform at least some level coordination of the sending and/or receiving data, control information and other functions performed by these different data service types of the UE.

According to an example implementation, a non-high reliability (e.g., eMBB) data service type (or eMBB application) on a UE may transmit uplink control information via a long physical uplink control channel (PUCCH) format length, while a high reliability/low latency (e.g., URLLC) data service type (or URLLC application) on the UE may transmit uplink control information via a short physical uplink control channel (PUCCH) format length (e.g., to allow for quicker or more frequent transmission of control information). Thus, in some cases, a longer PUCCH format may be used to allow more data/control information to be sent over a period of time (e.g., for eMBB data service type), while a shorter PUCCH format may be used to allow for a quicker transmission of uplink control information in the case where a shorter latency (e.g., such as for transmission of HARQ feedback) may be required (such as for URLLC data service type). Although, in another example implementation, the eMBB or non high reliability data service types (such as eMBB and others) may also use a short PUCCH format length.

Uplink control information (UCI) may generally include, for example one or more of: hybrid automatic repeat request (HARQ) feedback, e.g., HARQ Acknowledgement/ACK to acknowledge receipt of data, or HARQ negative acknowledgement/NAK to negatively acknowledge data (e.g., indicate that data was not received); and/or channel state information (CSI feedback, which may include, e.g., a rank indication (RI), a precoder matrix indication (PMI), and/or a channel quality indication (CQI)). Also, reference signals, such as demodulation reference signals (DMRS), may be transmitted by a UE, and may be used by a BS to perform channel estimation and then decode received signals or data from the UE.

According to an example implementation, for at least a portion of the uplink control information of the two data service types that overlaps in time, the UE may transmit at least a portion of the uplink control information of the two data service types at least partially simultaneously via different orthogonal signals. The different orthogonal signals may include a sequence with different cyclical shifts. According to an example implementation, a first orthogonal signal may include a first cyclical shift of a zero autocorrelation (ZAC) sequence, while a second orthogonal signal may include a second cyclical shift (different from the first cyclical shift) of the zero autocorrelation (ZAC) sequence. The different orthogonal sequences may allow the receiving BS to separately receive and/or identify the different uplink control information for the two data service types, and may allow the different uplink control information to be transmitted at least partially simultaneously over a physical resource block (PRB) (or a set of one or more PRBs, where a PRB may include a set of subcarriers).

Thus, an example implementation may include transmitting the uplink control information for the two different data service types, e.g., which may associated with different control channel format lengths, in parallel based on application of different orthogonal signals.

According to an example implementation, by way of illustrative example, a technique of parallel transmission of uplink control information in a wireless network may include: multiplying, by a user device, a first uplink control information, associated with a first control channel format length, with a first orthogonal signal to obtain a first spread control signal; multiplying, by the user device, a second uplink control information, associated with a second control channel format length, with a second orthogonal signal that is different than the first orthogonal signal to obtain a second spread control signal, the second control channel format length being different than the first control channel format length; receiving, by the user device, a first resource grant of one or more resource blocks for uplink transmission, the first resource grant associated with or provided for the first uplink control information; and transmitting, by the user device, at least partially simultaneously via the one or more resource blocks, the first spread control signal and the second spread control signal.

According to an example implementation, a technique may include, by way of illustrative example: multiplying the first uplink control information, associated with a long physical uplink control channel (PUCCH) format length and provided for a first data service type (such as an enhanced Mobile Broadband (eMBB) data service type), with a first cyclic shift of a zero autocorrelation (ZAC) sequence to obtain a first spread control signal; multiplying a second uplink control information, associated with a short physical uplink control channel (PUCCH) format length and provided for a second data service type (such as an ultra-reliable and low-latency communications (URLLC) data service type), with a second cyclic shift, different from the first cyclic shift, of the zero autocorrelation (ZAC) sequence to obtain the second spread control signal, the short PUCCH format length being different than the long PUCCH format length; and transmitting, by the user device, at least partially simultaneously via one or more resource blocks, the first spread control signal and the second spread control signal.

In another example implementation, rather than transmitting uplink control information in parallel via different orthogonal signals, at least a portion (overlapping portion) of one of the uplink control information may be punctured or dropped to allow transmission of the other uplink control information. According to an example implementation, data or HARQ feedback (but not demodulation reference signals) of a first data service type (e.g., of an eMBB data service type) may be dropped where such data or HARQ feedback overlaps with uplink control information of a second data service type (e.g., a URLLC data service type). For example, where there is an overlap in time of the uplink control information of two different data service types (e.g., eMBB and URLLC), this may allow a transmission of URLLC uplink control information (due to the shorter latency requirements for URLLC as compared to eMBB). In an example implementation, in the case where data or HARQ feedback of the eMBB data service type is dropped, then transmission power may be increased for transmission of a remaining portion of the eMBB data or HARQ feedback that is not dropped (e.g., to increase likelihood of a successful transmission/receipt of such data or HARQ feedback).

However, if the uplink control information for the eMBB data service type that overlaps the URLLC uplink control information is eMBB demodulation reference signals (DMRS), then, for example, dropping or discarding of the DMRS signals is not performed, and the DMRS signals of the eMBB data service type and the overlapping uplink control information for the URLLC data service type may be transmitted at least partially simultaneously based on application of different orthogonal signals, per the other example implementations described above.

Thus, according to an example implementation, a method may include determining, by a user device in a wireless network, that a first uplink control information includes uplink data or uplink hybrid automatic repeat request (HARQ) feedback provided for a first (e.g., eMBB) data service type, the first uplink control information associated with a first control channel format length and provided for the first data service type; determining, by the user device, a second uplink control information associated with a second control channel format length and provided for a second (e.g., URLLC) data service type, the second control channel format length being different than the first control channel format length and the second data service type being different than the first data service type; dropping at least a portion of the first uplink control information, that at least partially overlaps in time with at least a portion of the second uplink control information, the dropped portion of the first uplink control information including uplink data or uplink hybrid automatic repeat request (HARM) feedback provided for the first data service type but not including demodulation reference signals; and transmitting the second uplink control information, instead of the dropped portion of the first uplink control information, during a first resource block. The method may also further include increasing a transmission power of a remaining portion of the first uplink control information that is not dropped.

Further example details will now be described by way of illustrative examples.

According to an example implementation, in New Radio (NR) (5G) frame structure design, both slot and mini-slot may be supported. The duration of a slot may be either 7 or 14 symbols depending on the subcarrier spacing of the used numerology. Furthermore, slot aggregation may be configured at least for eMBB service. The possible durations of a mini-slot may at least include 1 or 2 OFDM (orthogonal frequency division multiplexing) symbols.

Figure 2:
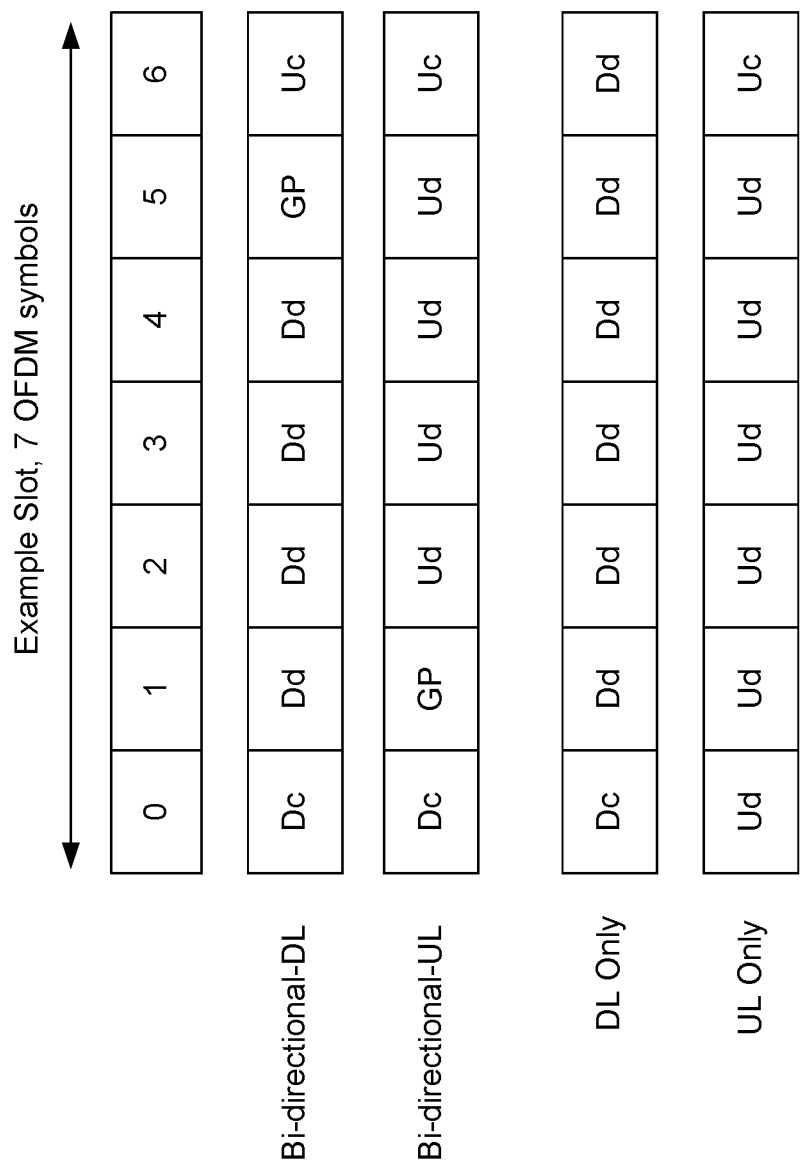
FIG. 2 is a diagram illustrating some slot types according to an example implementation.

FIG. 2 is a diagram illustrating some slot types according to an example implementation. Symbols are shown for each slot type, with Dc referring to downlink control information, Dd referring to downlink data, GP referring to a guard period, Uc referring to uplink control information, and Ud referring to uplink data. For example, there may be several slot types, as shown in FIG. 2, that provide the basic support for both TDD (time division duplexing) and FDD (frequency division duplexing). For the bi-directional slots, there is either downlink data or uplink data transmission in each slot, as well as the corresponding downlink and uplink control. Bi-directional slot may facilitate many TDD functionalities in the NR frame structure, such as, e.g., link direction switching between DL and UL, fully flexible traffic adaptation between DL and UL, and opportunity for low latency, provided that slot length is selected to be short enough.

In all slots of FIG. 2, multiplexing between DL control, DL/UL data, GP and UL control may be based, for example, primarily on time division multiplexing allowing fast energy efficient pipeline processing of control and data in the receiver. Physical Downlink Control Channel (PDCCH) may be conveyed in the DL control symbol(s) located at the beginning of the slot (or the mini-slot). However, the option of PDCCH and PDSCH multiplexing in frequency domain is not excluded. Additionally, frequency domain multiplexing of long PUCCH and PUSCH is supported.

In addition to bi-directional slots, there are also DL-only slot and UL-only slot in FIG. 2. These slot types may be needed at least in FDD mode, but also in certain TDD scenarios to allow longer transmission periods in same direction.

According to an example implementation, there can be multiple mini-slots in a slot, and different UEs can be scheduled in different mini-slots. Two main scenarios that benefit from mini-slots are latency reduction and unlicensed band operation. Especially, e.g., when 15 kHz subcarrier spacing is used, mini-slot may provide advantages over slot based transmission. Furthermore, mini-slots may also be a way to provide time multiplexing between different UEs when operating at high carrier frequencies (with higher subcarrier spacing) and when using RF beamforming architecture. Depending on the system operation point (e.g., offered traffic), the use of a mini-slot for lower air interface latency is useful not only for URLLC, but also for some eMBB applications (e.g. for quickly overcoming slow start TCP/transmission control protocol) procedures.

A mini-slot may be used, for example, to support URLLC—with strict delay requirements, which may require small scheduling granularity in time. If a packet is scheduled using a slot, e.g., for HARQ ACK feedback (FB), the delay (between data and HARQ FB for such data) may be 1 or 2 or 3 slots later, for example, which is a substantial delay that may not be tolerated by URLLC. For mini-slots, HARQ FB may be scheduled or transmitted much quicker, e.g., later in same slot that data was received, or in the next slot, which may better accommodate a stringent delay requirements for URLLC, for example.

Figure 3A:
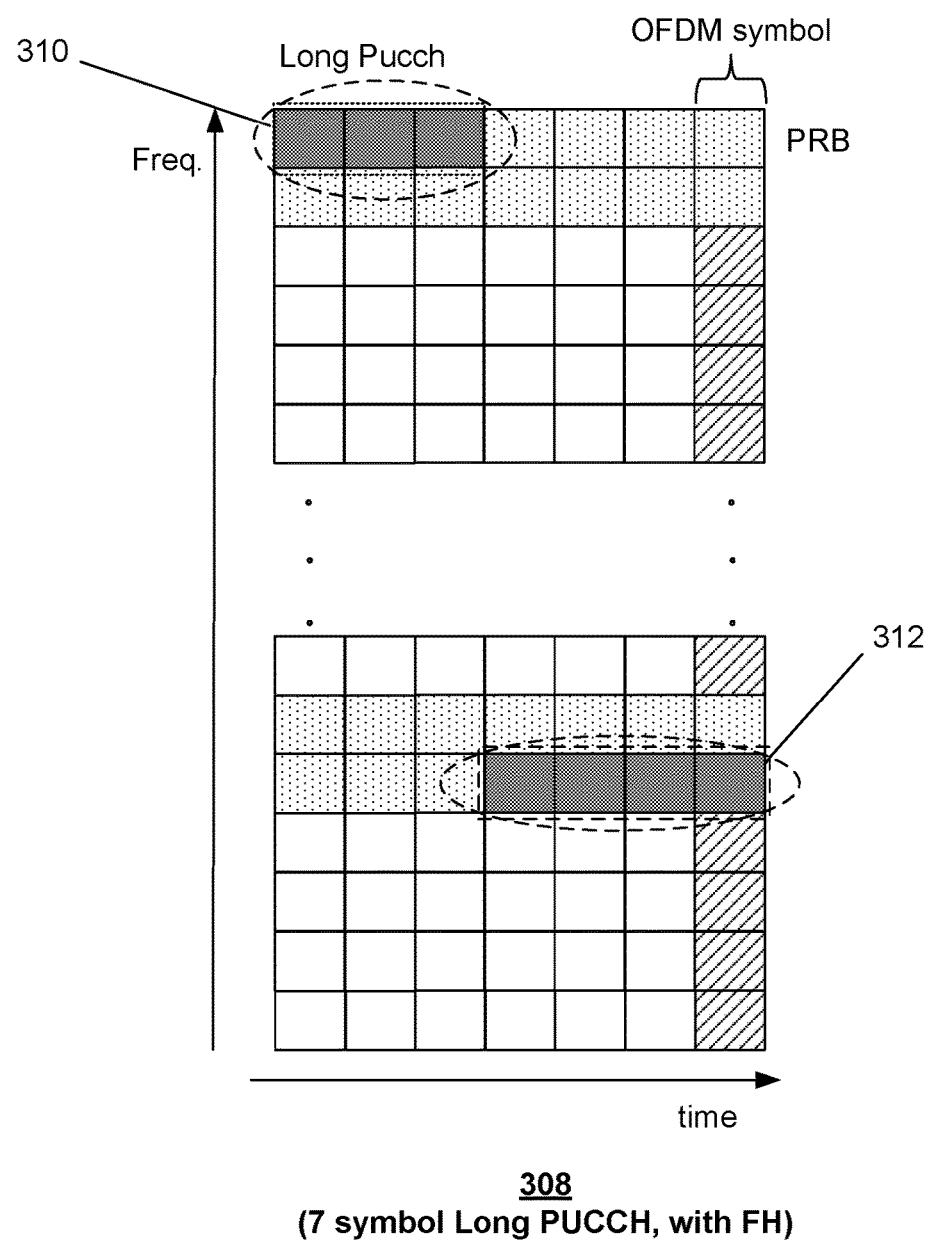
FIG. 3A is a diagram illustrating a long physical uplink control channel (PUCCH) format according to an example implementation.
Figure 3B:
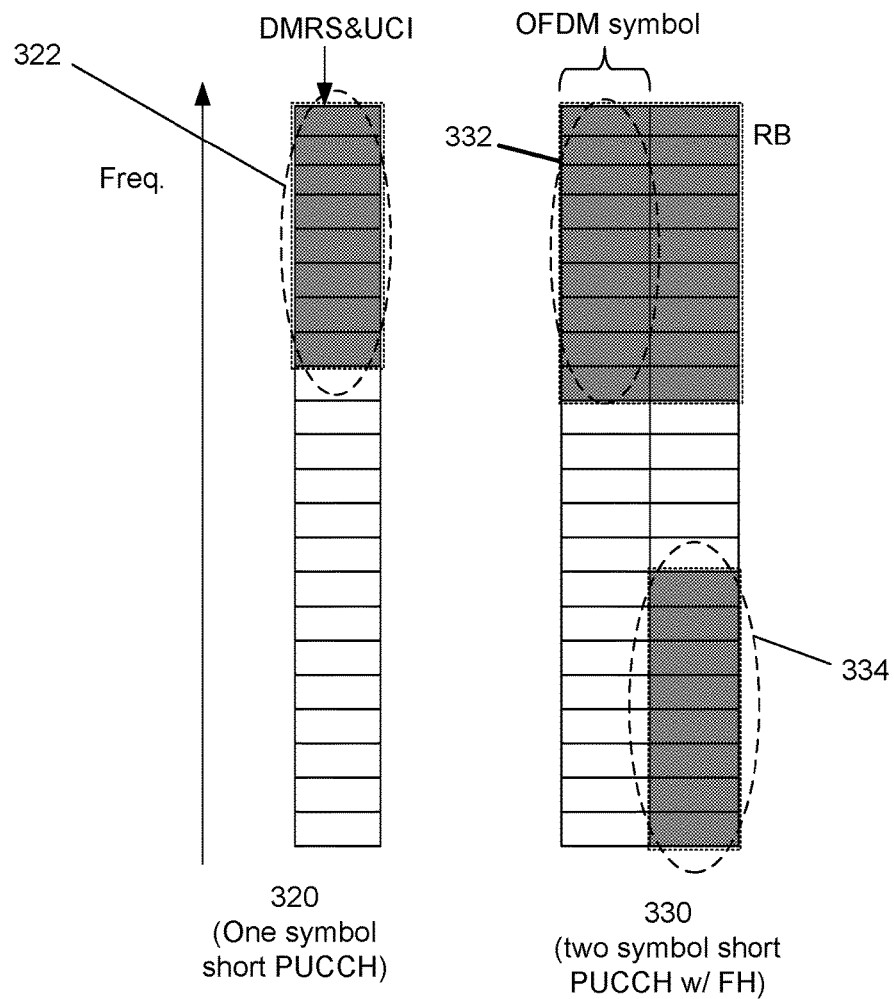
FIG. 3B is a diagram illustrating a short physical uplink control channel (PUCCH) format according to an example implementation, for both one symbol and two symbols.

FIG. 3A is a diagram illustrating a long physical uplink control channel (PUCCH) format according to an example implementation. FIG. 3B is a diagram illustrating a short physical uplink control channel (PUCCH) format according to an example implementation, for both one symbol and two symbols.

Referring to FIG. 3A, an example long PUCCH 308 of 7 symbols (e.g., same length as an example slot) is shown, as an illustrative example. Long PUCCH 308 may include, by way of example, a first group 310 of three OFDM symbols of a first physical resource block (RB or PRB, which may include a set of subcarriers), e.g., within the first row, and then a second group 312 of four additional OFDM symbols of a different PRB (e.g., within the ninth row), where each PRB (or physical resource block) may indicate a different frequency or different set of subcarriers, for example. For example, a first symbol of each of the groups 310 and 312 of symbols may include DMRS (e.g., to allow a BS to perform channel estimation and decode received uplink data or information), and the remaining symbols of each group 310 and 312 may include uplink control information such as HARQ feedback, for example. By having a long PUCCH 308 include a group 310 of symbols within a first PRB (the first row) and a group 312 of symbols within another row (e.g., the ninth row), this long PUCCH 308 employs frequency hopping (FH) to provide increased frequency diversity for the long PUCCH format. The long PUCCH shown in FIG. 3A may provide a low PAPR/CM (peak to average power ratio or cubic metric), e.g., when using DFT-S-OFDM based waveform. CP-OFDM may be supported as another waveform option for long PUCCH.

Referring to FIG. 3B, an example short PUCCH 320 of 1 symbol is shown, as an illustrative example, and may include a group 322 of PRBs within one OFDM symbol. Similarly, two symbol short PUCCH 330 uses frequency hopping, and may include a first group 332 of PRBs (physical resource blocks) within a first OFDM symbol, and a second group 334 of PRBs within a second OFDM symbol, for example.

A short PUCCH may be optimized to facilitate low latency and it supports also UL control signaling via bi-directional DL slot, for example, and a PUCCH variant that is related to mini-slot may be based on the short PUCCH structure. Frequency domain multiplexing between RS (reference signals, such as demodulation reference signals) and UCI (uplink control confirmation) is supported. Frequency diversity on short PUCCH may be provided based on frequency hopping, clustered transmission or scheduled transmission, depending on the scenario of interest. FDM (frequency division multiplexing) may be provided between UCI and DMRS. Both, for example, may be transmitted using modulated CAZAC sequences.

According to an example implementation, techniques are described to allow transmission of uplink control information for both the short PUCCH and the long PUCCH that at least partially overlap in time. Example techniques are described to allow at least partially simultaneous transmission of information via a long PUCCH (e.g., eMBB UCI) and information via a short PUCCH (e.g., URLLC UCI). Techniques are described that may support simultaneous transmission of slot based eMBB transmission (PUSCH or long PUCCH that carries UCI) and UCI related to mini-slot based URLLC (short PUCCH).

Figure 4:
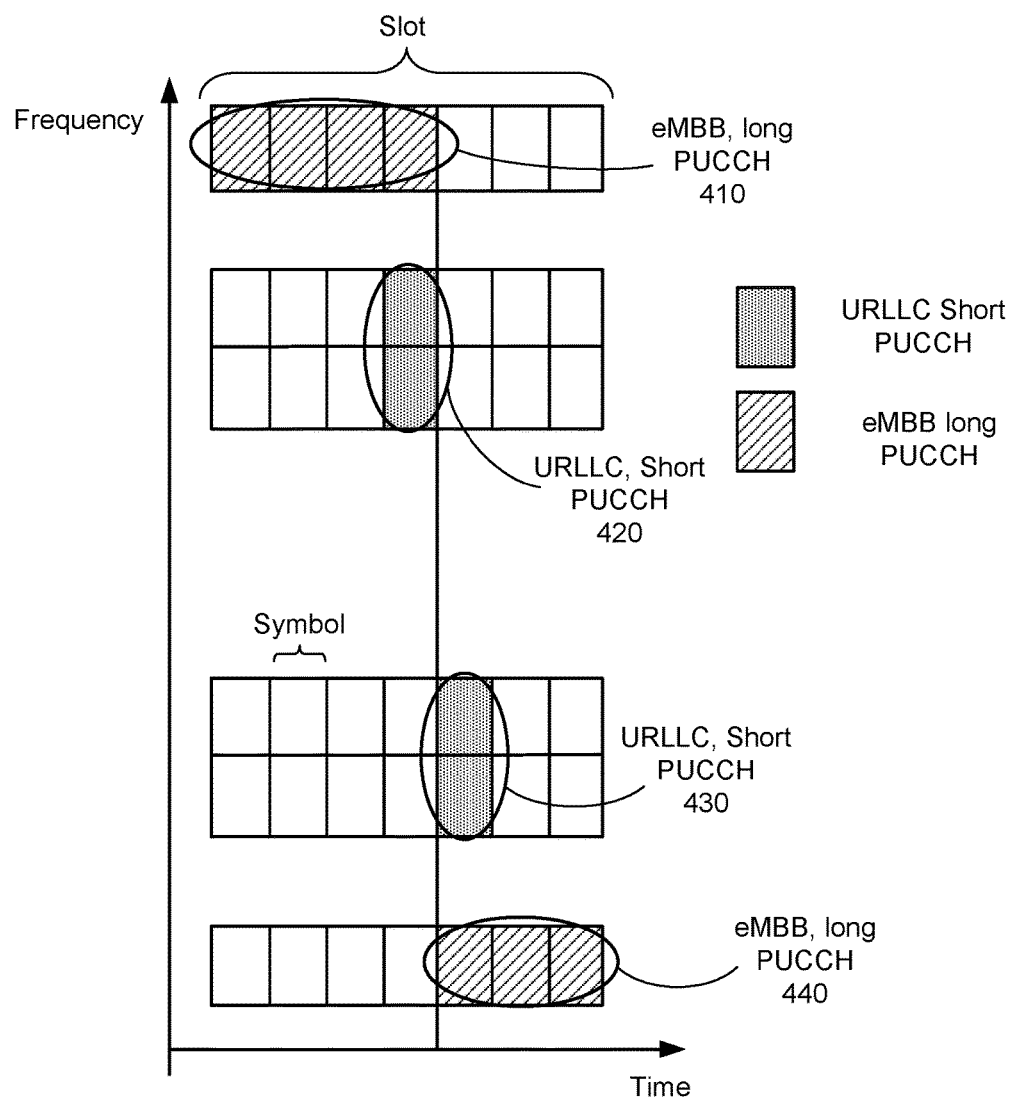
FIG. 4 is a diagram illustrating a multiplexing of eMBB uplink control information via a long PUCCH with URLLC uplink control information via a short PUCCH according to an example implementation.

FIG. 4 is a diagram illustrating a multiplexing of eMBB uplink control information via a long PUCCH with URLLC uplink control information via a short PUCCH according to an example implementation. eMBB (as an example first data service type) uplink control information, provided via long PUCCH, is provided via a group 410 of symbols within a PRB and a group 440 of symbols within a different PRB, providing frequency hopping. For example, a first symbol of each of groups 410 and 440 may include DMRS signals, and the subsequent symbols of these groups may include uplink control information such as HARQ feedback for received eMBB data. URLLC (as an example second data service type) uplink control information, provided via a short PUCCH, is provided via a group 420 of two PRBs within a symbol and a group 430 of two PRBs within a different symbol. It can be seen that at least a portion (a last symbol) of eMBB group 410 overlaps with URLLC group 420 of PRBs, while at least a portion (e.g., first symbol) of eMBB group 440 overlaps with URLLC group 430 of PRBs.

According to an example implementation, a long PUCCH for eMBB and short PUCCH for URLLC are shown in FIG.

4, and these both appear in the same slot. Timeline for eMBB—HARQ ACK/NAK FB may be sent by UE 1-3 slots later after receiving data. URLLC—HARQ FB may be sent in same slot that the data was received, and this might coincide with transmission of eMBB HARQ FB scheduled 1-3 slots earlier, as an example where HARQ FB of both long PUCCH (eMBB) and short PUCCH (URLLC) may overlap at least partially (e.g., for at least one symbol within slot).

In this scenario, eMBB and URLLC apply different TTI (transmission time interval) lengths for PUCCH. For example: eMBB PUCCH may include HARQ-ACK and/or CSI; URLLC PUCCH may include HARQ-ACK.

Furthermore, HARQ-ACK timing for eMBB and URLLC may be different. In a typical scenario, gNB (5G BS) may not yet know the presence of URLLC HARQ-ACK in a certain slot, when scheduling PDSCH (downlink data) that causes eMBB PUCCH (e.g., HARQ FB) transmission in the same slot.

For example, the gNB can schedule eMBB PDSCH (downlink data) in slot n and expect the UE to transmit HARQ-ACK feedback using long PUCCH in slot n+3. At this time, the gNB does not know yet if there will be any URLLC traffic in the next few slots. If URLLC traffic arrives later, the gNB can schedule URLLC PDSCH, e.g. in slot n+2, and the HARQ-ACK feedback is expected also in slot n+3 (possible with much faster timeline for URLLC). However, when the UE starts to construct the long PUCCH transmission for eMBB HARQ-ACK feedback in slot n+3, the UE may still be in the middle of decoding URLLC PDSCH and HARQ-ACK feedback for URLLC is not available yet. In such a situation, there is overlap in time for the two PUCCHs (eMBB and URLLC) in the same transmission, but there may be only one PRB for such transmission of overlapping signals. A similar situation also exists when the gNB sends a UL (uplink) grant to trigger slot-based eMBB PUSCH (uplink data) transmission.

Therefore, according to an example implementation, it may be desirable to transmit the short PUCCH and long PUCCH information, at least partially simultaneously where there is overlap. This may allow information from (at least an overlapping portion of) two different PUCCH channels to be transmitted via one PRB (or a same set of PRBs). According to an example implementation, this may be performed by using different orthogonal signals, such as a ZAC (zero autocorrelation) sequence with different cyclic shifts (see, e.g., example shown in FIG. 5 below). Illustrative examples of a ZAC sequence may include a CAZAC (constant amplitude zero autocorrelation) sequence, such as a Zadoff-Chu sequence, or a numerically searched sequence that maintains Zero Autocorrelation (ZAC) property although does not necessarily provide a constant amplitude. Another option or example implementation may include, where there is overlap between the two PUCCH signals, dropping or discarding of one of the uplink control information (e.g., dropping of overlapping or conflicting eMBB uplink information), e.g., to allow a higher priority URLLC information to be transmitted instead (e.g., so long as eMBB DMRS signals are not dropped or discarded, for example) (see, e.g., example shown in FIG. 6 below).

Figure 5:
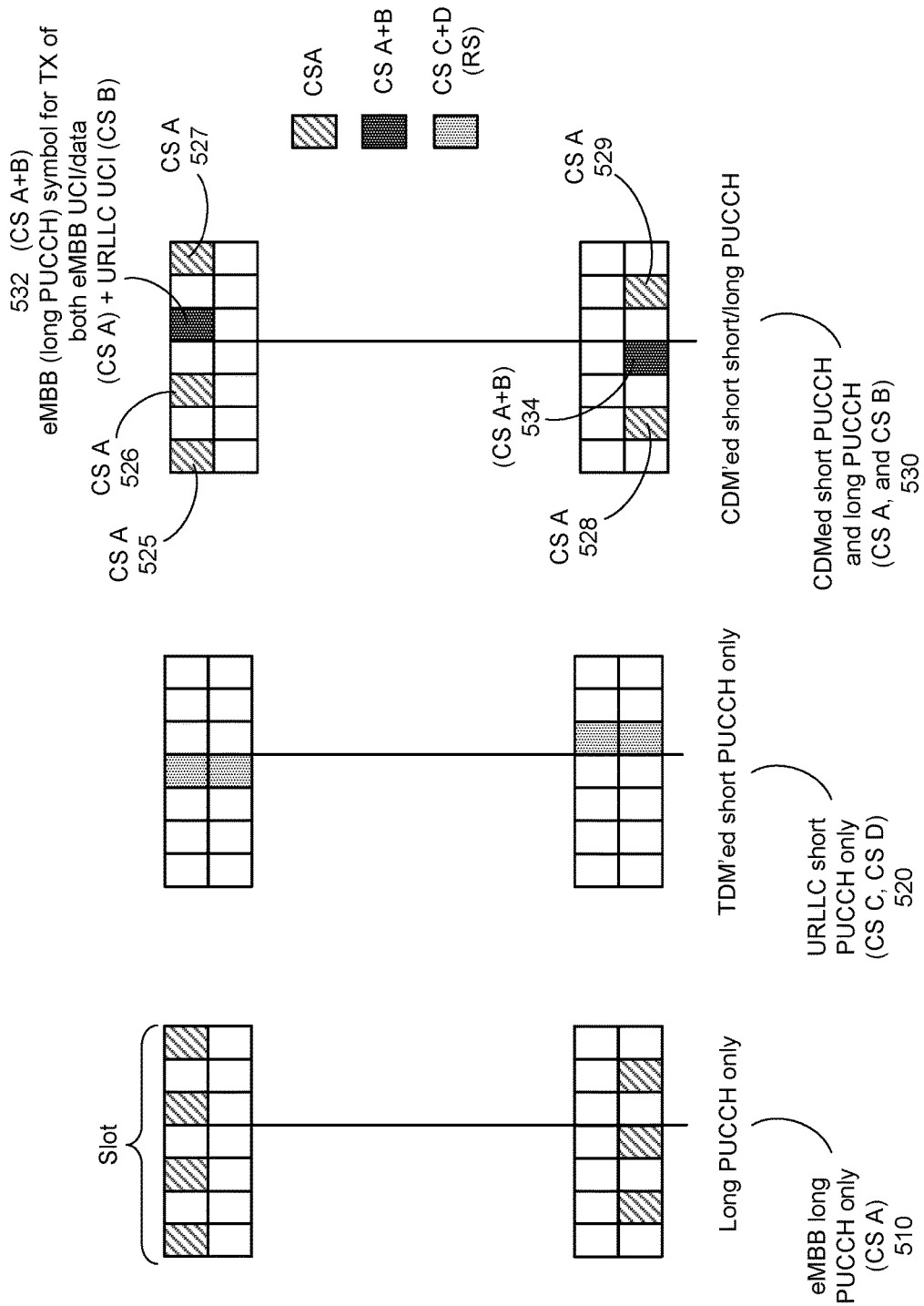
FIG. 5 is a diagram illustrating a transmission of an overlapping long PUCCH and short PUCCH using different cyclic shifts according to an example implementation.

FIG. 5 is a diagram illustrating a transmission of an overlapping long PUCCH and short PUCCH using different cyclic shifts according to an example implementation. According to an example implementation, CAZAC sequence with different cyclic shifts for different signals allows PUCCH channels from different applications or different data services (e.g., which may be different data service types, such as eMBB and URLLC) to be multiplexed or combined into same PRB for transmission and the CAZAC orthogonality allows the receiving BS to detect each PUCCH signal separately (e.g., allowing an overlapping portion of short PUCCH and long PUCCH to be transmitted via a PRB/PRBs).

Referring to FIG. 5, at 510, the transmission of eMBB long PUCCH only is shown, using cyclic shift A (CS A). At 520, transmission of URLLC short PUCCH only is shown, using both CS C and CS D. Embodiment 1 shown in FIG. 4 relates to the case where the eMBB PUCCH (format) is based on modulated CAZAC sequences.

At 530, a combined, or code division multiplexed short PUCCH and long PUCCH is shown. Symbols 525 (e.g., eMBB DMRS via CS A), 526 and 527 (e.g., eMBB UCI such as eMBB HARQ FB via CS A), 528 (e.g., eMBB DMRS via CS A) and 529 (e.g., eMBB UCI via CS A) are shown, which are just the long PUCCH for eMBB. Symbols 532 and 534 includes a portion of both long PUCCH for eMBB (via CS A) and short PUCCH for URLLC (via CS B). Thus, at 532 and 534, the slot based eMBB PUCCH transmission uses cyclic shift A (CS A) for both DMRS and UCI parts, and URLLC PUCCH transmission uses cyclic shift B (CS B). At symbols 532 and 534, the eMBB UCI via CS A and the URLLC UCI via CS B are transmitted simultaneously via these symbols, because the long PUCCH and short PUCCH overlap at these times.

According to an example implementation, one advantage of transmitting both the eMBB long PUCCH simultaneously with the URLLC short PUCCH is that it is unnecessary to transmit DMRS for both eMBB long PUCCH and URLLC short PUCCH. Rather, for example, the DMRS at symbol 525, for example, may be transmitted by UE for both eMBB long PUCCH and URLLC short PUCCH, thus allowing the DMRS signals for URLLC short PUCCH to be omitted, thereby freeing up one or more symbols or resources within the slot for transmission of additional information or data. Thus, the UE may advantageously send one RS (e.g., DMRS) for both short PUCCH (URLLC) and long PUCCH (eMBB). Thus, according to an example implementation, URLLC PUCCH does not contain separate RS (DMRS) when multiplexed with eMBB PUCCH. But, the URLLC may assume (and relies upon) that eMBB long PUCCH will transmit DMRS, e.g., via symbols 525 and/or 528. Instead, channel estimate based on eMBB PUCCH DMRS is used for both eMBB and URLLC, which is an advantage of transmitting (at least partially simultaneously) both PUCCH channels using different cyclically shifted CAZAC sequences CS A and CS B are transmitted in parallel in the same PRB (physical resource block, which may also be referred to as RB). It is anticipated that if cyclic shifts are selected carefully, the CM/PAPR will be reasonably low (well below that of CP-OFDM). Thus, two sequences or signals for short and long PUCCH may transmitted with different cyclic shifts, and the cyclic shifts may be selected to keep PAPR low.

Figure 6:
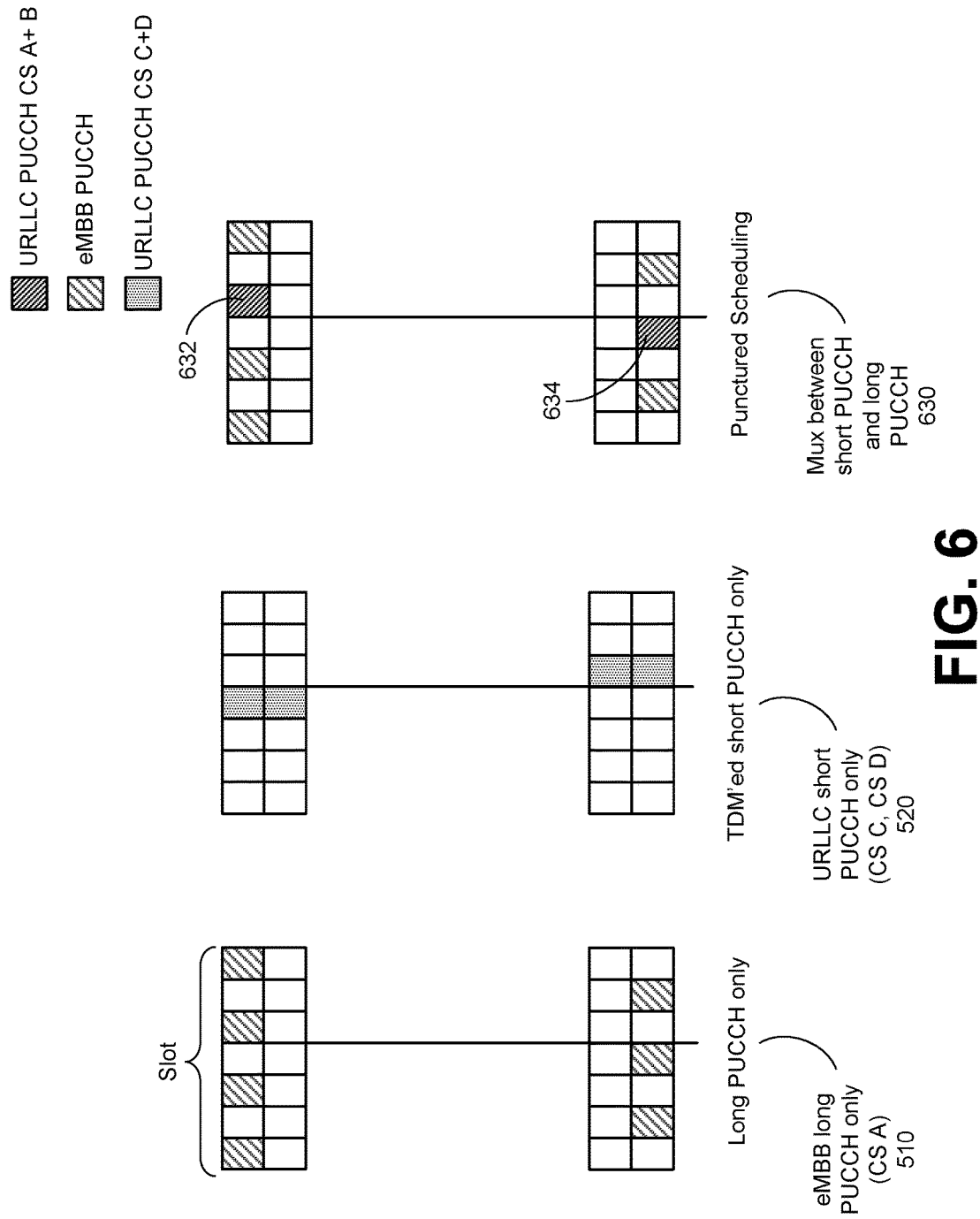
FIG. 6 is a diagram illustrating multiplexing or switching between short PUCCH and long PUCCH where these signals overlap.

FIG. 6 is a diagram illustrating multiplexing or switching between short PUCCH and long PUCCH where these signals overlap, according to an example implementation. The eMBB signal (see 510) at any of the long PUCCH symbols may be either an eMBB DMRS signal or a eMBB UCI (e.g., HARQ FB) signal. According to an example implementation, there are two different possibilities of what is transmitted at symbols 632 and 634: 1) If URLLC PUCCH (URLLC UCI) overlaps with eMBB DMRS, then use cyclic shifts—to transmit both eMBB DMRS via CS A and URLLC UCI via CS B, as in FIG. 5 (e.g., this is because DMRS should not be dropped/discarded, as this DMRS is used for both long PUCCH for eMBB and short PUCCH for URLLC); or, 2) If URLLC PUCCH overlaps with eMBB UCI (uplink HARQ FB/PUCCH) or uplink data symbols (PUSCH), then puncture/drop the eMBB HARQ FB or data symbols transmit only URLLC UCI via CS B only due to puncturing. (A+) in parentheses means that CS A may or may not be there depending on the case (multiplexed where both short and long PUCCH are transmitted via different CSs, or punctured where only short PUCCH is transmitted via CS B). These two cases will occur separately for each symbol, because each eMBB long PUCCH symbol will either be DMRS or PUCCH UCI/PUSCH data, and will not be both DMRS and UCI/data, and it will depend on how the symbols line up between long PUCCH and short PUCCH (the case will depend on which long PUCCH symbol overlaps with the short PUCCH), e.g., whether the long PUCCH is DMRS symbol (transmit both long and short PUCCH via CSs) or a non-DMRS symbol (drop long PUCCH UCI symbol).

Also, according to an example implementation, the URLLC short PUCCH signal is transmitted via resources (e.g., PRBs) obtained by the UE for or on behalf of the eMBB long PUCCH. Also, in the case where the long PUCCH signal is dropped or discarded, an increase in transmission power (power boost) may be applied to the remaining (non-discarded/non-dropped) portion of the long PUCCH signal, e.g., to increase the likelihood that such remaining eMBB long PUCCH information will be successfully transmitted to the BS, for example.

According to an example implementation, FIG. 6 may refer to a case where URLLC PUCCH is overlapping with eMBB PUCCH (e.g., eMBB HARQ FB) or PUSCH (eMBB uplink data), e.g., based on DFT-S-OFDM or CP-OFDM. In such case, the eMBB long PUCCH signal (eMBB HARQ FB of uplink data) will be dropped or punctured, in favor of transmitting the higher reliability (stricter latency requirements) information, such as the URLLC short PUCCH UCI (e.g., short PUCCH HARQ FB).

On the other hand, if a eMBB long PUCCH non-DMRS signal (e.g., eMBB HARQ FB or data) aligns or overlaps with the URLLC short PUCCH, then both long and short PUCCH information will be transmitted via different orthogonal signals/different cyclic shifts. eMBB DMRS may use CS A and URLLC PUCCH may use CS B. If URLLC PUCCH overlaps with eMBB PUCCH (PUCCH Data)/PUSCH Data symbol: eMBB PUCCH/PUSCH symbol is punctured. And, for example, URLLC PUCCH transmission may use the predefined (or obtained via resource grant) resource elements or PRBs of eMBB PUCCH/PUSCH. URLLC PUCCH utilizes CS B, and no separate RS (DMRS) is needed for URLLC, since it may be assumed that RS (DMRS signals) have already been provided during the first symbol(s) of the slot by long PUCCH/eMBB. Power boost may be applied for the remaining (undropped) eMBB PUSCH/PUCCH symbols of the slot.

Power control for the case when CS A and CS B are transmitted in parallel: (when transmitting two CS cyclic shifted signals at the same time , how do we control the power): 1) UE may utilize higher transmission power on symbols carrying CS A and CS B compared to TX of eMBB PUCCH/PUSCH symbols without TX of URLLC UCI; where transmission (Tx) power increase may correspond to Tx power of data part of TDM'ed URLLC short PUCCH; 2) When transmission (Tx) power of UE is limited (maybe UE has already reached max UE transmission power), then UE may need to limit its Tx power), then one of the following prioritization rules can be applied (e.g., to satisfy Tx power of higher priority signals first, and then any remaining power can be used for lower priority signals). Different ways to prioritize signals. A) DMRS CS A has the highest priority, URLLC UCI CS B has the second highest priority, and eMBB UCI CS A has the lowest priority. B) Alternatively, DMRS CS A and URLLC UCI CS B have equal priority. C) Transmit power is shared between DMRS CS A and URLLC UCI CS B according to the Tx power ratio between data and DMRS parts of TDM'ed (time division multiplexed) URLLC short PUCCH. eMBB UCI CS A may have the lowest priority.

Note that although the various example may use eMBB and URLLC, as example applications or data service types to illustrate the concept, these example techniques may be generally applicable in a case when such simultaneous transmission of a long UL signal and a short UL signal is necessary.

Further details will now be described related to an illustrative example implementation:

Some Example Preparatory Steps:

UE receives resource configuration for eMBB associated UL signal containing configuration of first cyclic shift (cyclic shift A), and UE receives resource configuration or derive the resource for short PUCCH associated with URLLC (cyclic shift C, D). Resource configuration may be indicated in multiple messages, e.g. in UE-specific RRC (radio resource control) configuration messages and in dynamic configuration via DCI. Based on the received resource configuration, UE determines second cyclic shift (cyclic shift B). UE receives eMBB DL signal and URLLC DL signal Some further Example Main steps: (with various examples or features that may be provided)

UE transmits URLLC HARQ feedback on subcarriers allocated to the eMBB associated UL signal using the second cyclic shift (CS B), and UL signal (of first type) corresponding to the eMBB DL signal using the first cyclic shift (CS A); wherein the UL signal transmission occurs partially simultaneously with the URLLC HARQ feedback transmission; wherein the UL signal of first type is DMRS or data symbol spread with CAZAC signal; wherein the eMBB DL signal may be eMBB DL data transmission or grant for eMBB UL data transmission and the corresponding UL signal is HARQ feedback or eMBB UL data transmission, respectively; wherein the transmission power of the UL signal and the URLLC HARQ feedback is larger than the transmission power of the UL signal either before or after the transmission of URLLC HARQ feedback; When UE cannot transmit URLLC HARQ feedback at a predetermined second power and the UL signal of the first type at a predetermined first power, UE reduces the power of the UL signal of the first type (or drops the UL signal) when the UL signal of first type is a data symbol spread with CAZAC signal; when the UL signal is not of first type, i.e. it is UL data symbol not modulated with CAZAC sequence, the UL signal is dropped; when UE continues the UL signal transmission after the transmission of URLLC HARQ feedback, the UL signal transmission power is larger than the predetermined first power (used in the transmission of UL signal before the transmission of URLLC HARQ feedback).

According to example implementations, there may be two (or at least two) configuration options for long PUCCH based on DFT-S-OFDM or CP-OFDM: Option #1) Parallel transmission of URLLC PUCCH and eMBB PUCCH (See FIG. 5); and Option #2) Multiplexing between URLLC PUCCH and eMBB PUCCH (where eMBB PUCCH signal may be dropped or punctured) (e.g., see FIG. 6); and Option #1 may be used at least in the case when DFT-S-OFDM waveform, for example. Related to Option #1, in the preferred embodiment two cyclic shifts (CS A, CS B) are allocated in the following way:

CS B=CS A+1 (or CS A−1) or

CS B=CS A+2 (or CS A−2)

Cyclic shift A is obtained based on eMBB PUCCH resource allocation procedures (explicit and/or implicit resource allocation). gNB (5G BS) may take into account in the long PUCCH resource allocation that CS B is unoccupied when URLLC needs to be multiplexed.

If URLLC PUCCH overlaps with eMBB PUCCH/PUSCH Data symbol, eMBB PUCCH/PUSCH symbol is punctured and power boost may be applied for the remaining eMBB PUSCH/PUCCH symbols of the slot.

The amount of power boost may be pre-configured by network and/or may be related to the number of data symbols punctured on eMBB PUCCH/PUSCH (d1) and on the number of data symbols that are power boosted (d2). E.g. Pboost [dB]=10*log 10(1+d1/d2).

In some cases, UE may not have enough power headroom to boost the power the amount expected by network. If QPSK (quadrature phase shift keying) is used on PUCCH/PUSCH, UE power boosts the symbols as much as it can.

If higher-order modulation (higher than QPSK) is used on eMBB PUSCH/PUCCH, UE skips (omits) the power boosting. This may be generic rule, or a rule that is applied when UE cannot boost the power the amount expected by network.

Some Example Advantages:

The example implementations may allow a more efficient use of resources by allowing a combining of uplink transmission of different PUCCH formats/lengths, and/or for different data service types into one slot, for example.

The example implementations low CM/PAPR properties of the signal to be maintained for the combination of URLLC PUCCH and eMBB PUCCH/PUSCH.

The example implementations may allow an improvement to the URLLC PUCCH coverage when multiplexed with eMBB PUCCH/PUSCH.

The example implementations may provide low latency for high reliability data service type, such as URLLC PUCCH, while also accommodating lower reliability data service types, such eMBB, e.g., within a same slot and/or overlapping information.

Figure 7:
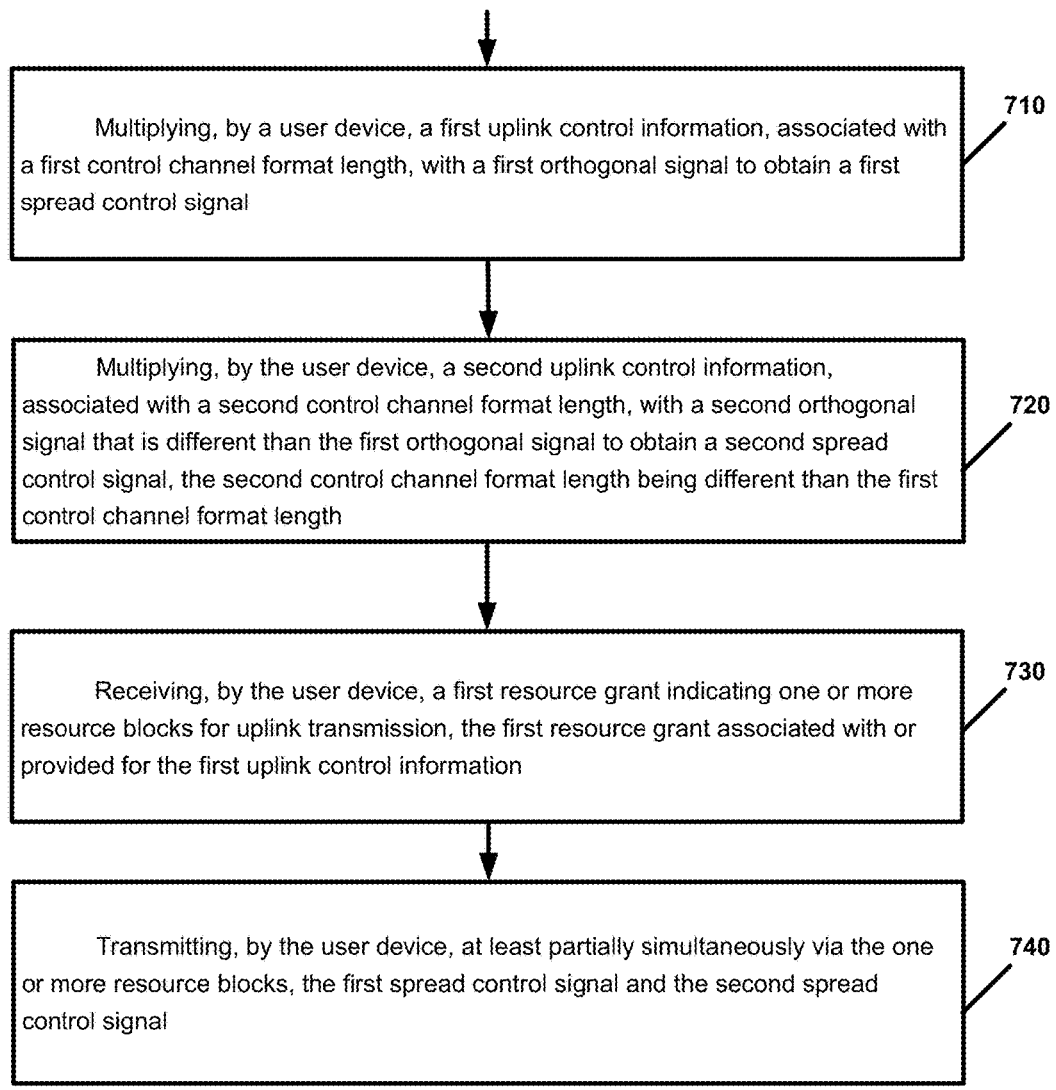
FIG. 7 is a flow chart illustrating operation of a user device according to an example implementation.

Example 1. FIG. 7 is a flow chart illustrating operation of a user device according to an example implementation. The flow chart of FIG. 7 is directed to a method of parallel transmission of uplink control information in a wireless network. Operation 710 includes multiplying, by a user device, a first uplink control information, associated with a first control channel format length, with a first orthogonal signal to obtain a first spread control signal. Operation 720 includes multiplying, by the user device, a second uplink control information, associated with a second control channel format length, with a second orthogonal signal that is different than the first orthogonal signal to obtain a second spread control signal, the second control channel format length being different than the first control channel format length. Operation 730 includes receiving, by the user device, a first resource grant indicating one or more resource blocks for uplink transmission, the first resource grant associated with or provided for the first uplink control information. Operation 740 includes transmitting, by the user device, at least partially simultaneously via the one or more resource blocks, the first spread control signal and the second spread control signal.

Example 2. According to an example implementation of the method of example 1, wherein the first uplink control information is provided for a first data service; and wherein the second uplink control information is provided for a second data service.

Example 3. According to an example implementation of the method of example 1, wherein the multiplying a first uplink control information comprises multiplying, by a user device, a first uplink control information, associated with a first control channel format length and provided for a first data service type, with a first orthogonal signal to obtain a first spread control signal; wherein the multiplying a second uplink control information comprises multiplying, by the user device, a second uplink control information, associated with a second control channel format length and provided for a second data service type, with a second orthogonal signal that is different than the first orthogonal signal to obtain a second spread control signal, the second control channel format length being different than the first control channel format length and the second data service type being different than the first data service type.

Example 4. According to an example implementation of the method of any of examples 1-3, wherein only one of the first spread control signal and the second spread control signal further comprises demodulation reference signals for both the first uplink control information and the second uplink control information.

Example 5. According to an example implementation of the method of any of examples 1-4, further including: performing, by the user device, symbol based frequency hopping for at least one of the first spread control signal and the second spread control signal.

Example 6. According to an example implementation of the method of any of examples 1-5, wherein the first orthogonal signal comprises a first cyclical shift of a zero autocorrelation (ZAC) sequence; and wherein the second orthogonal signal comprises a second cyclical shift, different than the first cyclical shift, of the ZAC sequence.

Example 7. According to an example implementation of the method of any of examples 1-6, wherein the first uplink control information is provided for a first data service or a first application running on the user device, and the second uplink control information is provided for a second data service or a second application running on the user device: wherein the first uplink control information comprises at least one of: hybrid automatic repeat request (HARQ) feedback for data of the first data service; and channel state information; wherein the second uplink control information comprises HARQ feedback for data of the second data service; wherein the first data service and the second data service are either a same data service type or different data service types.

Example 8. According to an example implementation of the method of example 3, wherein the first data service type comprises one of the following: an enhanced mobile broadband (eMBB) data service type; and an ultra-reliable and low-latency communications data service type; and wherein the second data service type comprises one of the following: an enhanced mobile broadband (eMBB) data service type; and an ultra-reliable and low-latency communications data service type, wherein the second data service type is different than the first data service type.

Figure 8:
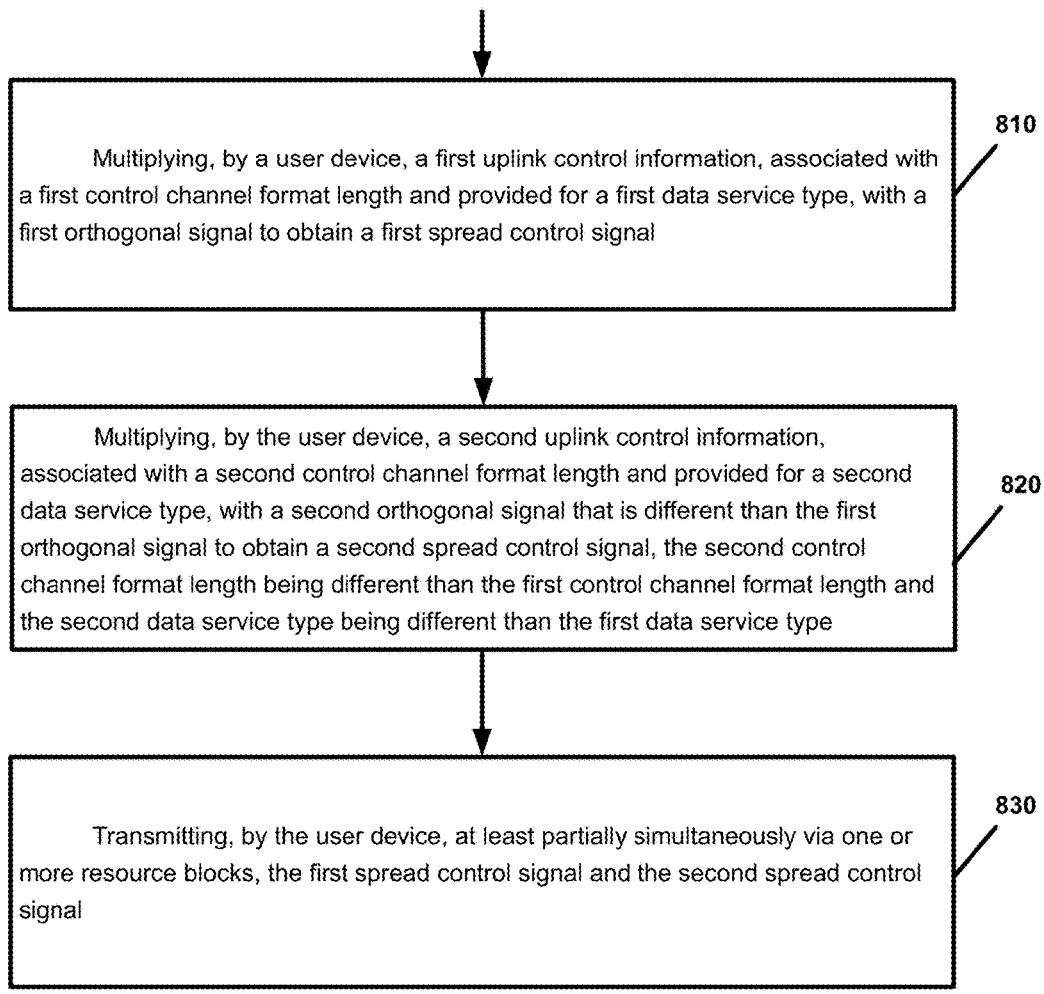
FIG. 8 is a flow chart illustrating operation of a user device according to another example implementation.

Example 9. FIG. 8 is a flow chart illustrating operation of a user device according to another example implementation.

The method of example 9 is directed to method of parallel transmission of uplink control information in a wireless network. Operation 810 includes multiplying, by a user device, a first uplink control information, associated with a first control channel format length and provided for a first data service type, with a first orthogonal signal to obtain a first spread control signal. Operation 820 includes multiplying, by the user device, a second uplink control information, associated with a second control channel format length and provided for a second data service type, with a second orthogonal signal that is different than the first orthogonal signal to obtain a second spread control signal, the second control channel format length being different than the first control channel format length and the second data service type being different than the first data service type. And, operation 830 includes transmitting, by the user device, at least partially simultaneously via one or more resource blocks, the first spread control signal and the second spread control signal.

Example 10. According to an example implementation of the method of example 9, and further including receiving, by the user device, a first resource grant indicating the one or more resource blocks for uplink transmission, the first resource grant associated with the first uplink control information and provided with respect to the first data service type.

Example 11. According to an example implementation of the method of example 10, further including receiving, by the user device, a second resource grant indicating one or more additional resource blocks for uplink transmission, the second resource grant associated with the second uplink control information and provided with respect to the second data service type, wherein the additional resource blocks indicated by the second resource grant are used for transmission of the second uplink control information when the first uplink control information is not present, and wherein at least a portion of the additional resource blocks indicated the second resource grant are left unused when the first uplink control information is present.

Example 12. According to an example implementation of the method of example 9, wherein only one of the first spread control signal and the second spread control signal further comprises demodulation reference signals for both the first uplink control information and the second uplink control information.

Example 13. According to an example implementation of the method of example 9, further including performing, by the user device, symbol based frequency hopping for at least one of the first spread control signal and the second spread control signal.

Example 14. According to an example implementation of the method of example 9, wherein the first orthogonal signal comprises a first cyclical shift of a zero autocorrelation (ZAC) sequence; and wherein the second orthogonal signal comprises a second cyclical shift, different than the first cyclical shift, of the ZAC sequence.

Example 15. According to an example implementation of the method of example 9, wherein the first uplink control information comprises at least one of: hybrid automatic repeat request (HARQ) feedback for data of the first data service type; and channel state information; wherein the second uplink control information comprises HARQ feedback for data of the second data service type.

Example 16. According to an example implementation of the method of example 9, wherein the first data service type comprises one of the following: an enhanced mobile broadband (eMBB) data service type; and an ultra-reliable and low-latency communications data service type; and wherein the second data service type comprises one of the following: an enhanced mobile broadband (eMBB) data service type; and an ultra-reliable and low-latency communications data service type, wherein the second data service type is different than the first data service type.

Example 17. According to an example implementation of the method of example 9, wherein the multiplying the first uplink control information comprises multiplying the first uplink control information, associated with a long physical uplink control channel (PUCCH) format length and provided for an enhanced Mobile Broadband (eMBB) data service type, with a first cyclic shift of a zero autocorrelation (ZAC) sequence to obtain a first spread control signal; and wherein the multiplying the second uplink control information comprises multiplying a second uplink control information, associated with a short physical uplink control channel (PUCCH) format length and provided for an ultra-reliable and low-latency communications (URLLC) data service type, with a second cyclic shift, different from the first cyclic shift, of the zero autocorrelation (ZAC) sequence to obtain the second spread control signal, the short PUCCH format length being different than the long PUCCH format length.

Example 18. According to an example implementation of the method of example 17, wherein the first spread control signal provided for the eMBB data service type includes demodulation reference signals for both the eMBB data service type and the URLLC data service type.

Example 19. According to an example implementation of the method of example 9, further including: determining whether the first spread control signal includes demodulation reference signals; and, adjusting a transmission power of at least one of the first uplink control information and the second uplink control information based on whether the first spread control signal includes demodulation reference signals.

Example 20. According to an example implementation of the method of example 9, further including determining that the spread control signal does not include demodulation reference signals; and adjusting, based on the determining, a transmission power of the first uplink control information to be less than a transmission power of the second uplink control information.

Example 21. An apparatus includes at least one processor and at least one memory including computer instructions, when executed by the at least one processor, cause the apparatus to perform the method of any of examples 9-20.

Example 22. An apparatus comprising at least one processor and at least one memory including computer instructions, when executed by the at least one processor, cause the apparatus to: multiply, by a user device, a first uplink control information, associated with a first control channel format length and provided for a first data service type, with a first orthogonal signal to obtain a first spread control signal; multiply, by the user device, a second uplink control information, associated with a second control channel format length and provided for a second data service type, with a second orthogonal signal that is different than the first orthogonal signal to obtain a second spread control signal, the second control channel format length being different than the first control channel format length and the second data service type being different than the first data service type; and receive, by the user device, a first resource grant of one or more resource blocks for uplink transmission, the first resource grant associated with the first uplink control information and provided with respect to the first data service type; and transmit, by the user device, at least partially simultaneously via the one or more resource blocks, the first spread control signal and the second spread control signal.

Figure 9:
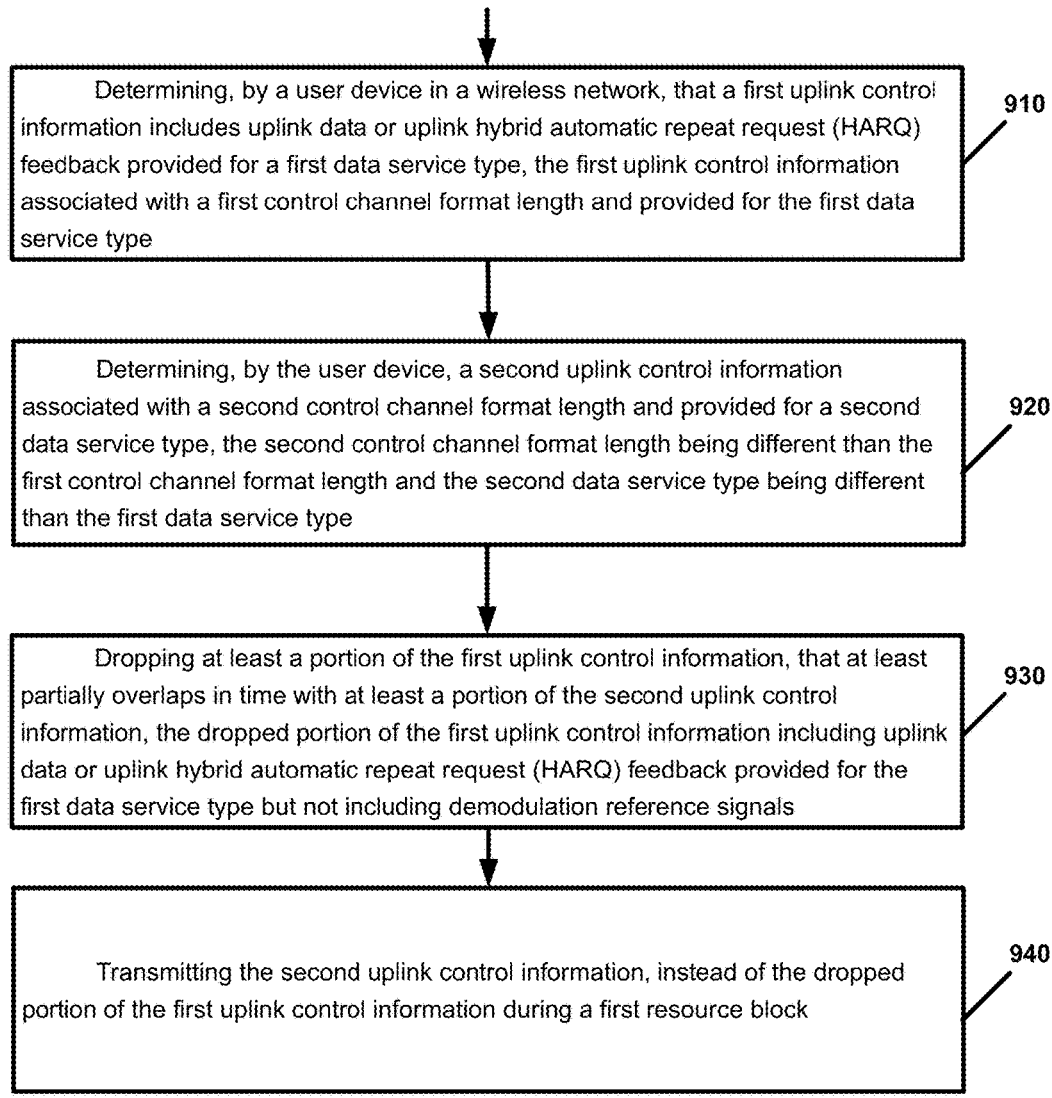
FIG. 9 is a flow chart illustrating operation of a user device according to another example implementation.

Example 23. FIG. 9 is a flow chart illustrating operation of a user device according to another example implementation. Operation 910 includes determining, by a user device in a wireless network, that a first uplink control information includes uplink data or uplink hybrid automatic repeat request (HARQ) feedback provided for a first data service type, the first uplink control information associated with a first control channel format length and provided for the first data service type. Operation 920 includes determining, by the user device, a second uplink control information associated with a second control channel format length and provided for a second data service type, the second control channel format length being different than the first control channel format length and the second data service type being different than the first data service type. Operation 930 includes dropping at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals. And, operation 940 includes transmitting the second uplink control information, instead of the dropped portion of the first uplink control information during a first resource block.

Example 24. According to an example implementation of the method of example 23, further including increasing a transmission power of a remaining portion of the first uplink control information that is not dropped.

Example 25. According to an example implementation of the method of example 23, wherein the determining that a first uplink control information includes uplink data or uplink HARQ feedback provided for the first data service type comprises determining that the first uplink control information includes uplink data or uplink HARQ feedback for an enhanced Mobile Broadband (eMBB) data service type, the first uplink control information associated with a long physical uplink control channel (PUCCH) format length; wherein the determining the second uplink control information comprises determining the second uplink control information associated with a short physical uplink control channel (PUCCH) format length and provided for an ultra-reliable and low-latency communications (URLLC) data service type.

Example 26. According to an example implementation, an apparatus comprising at least one processor and at least one memory including computer instructions, when executed by the at least one processor, cause the apparatus to perform the method of any of examples 23-25.

Example 27. According to an example implementation, a method of receiving a parallel transmission of uplink control information in a wireless network is provided, including: configuring, by a base station of a user device to: multiply, by the user device, a first uplink control information, associated with a first control channel format length, with a first orthogonal signal to obtain a first spread control signal; and multiply, by the user device, a second uplink control information, associated with a second control channel format length, with a second orthogonal signal that is different than the first orthogonal signal to obtain a second spread control signal, the second control channel format length being different than the first control channel format length; and transmitting, by the base station to the user device, a first resource grant indicating one or more resource blocks for uplink transmission, the first resource grant associated with or provided for the first uplink control information; and receiving, by the base station from the user device, at least partially simultaneously via the one or more resource blocks, the first spread control signal and the second spread control signal.

Example 28. According to an example implementation of the method of example 27, further comprising transmitting, by the base station to the user device a second resource grant indicating one or more additional resource blocks for uplink transmission, the second resource grant associated with the second uplink control information, wherein the additional resource blocks indicated by the second resource grant are used for transmission of the second uplink control information by the user device when the first uplink control information is not present.

Example 29. An apparatus including at least one processor and at least one memory including computer instructions, when executed by the at least one processor, cause the apparatus to: configure, by a base station of a user device to: multiply, by the user device, a first uplink control information, associated with a first control channel format length, with a first orthogonal signal to obtain a first spread control signal; and multiply, by the user device, a second uplink control information, associated with a second control channel format length, with a second orthogonal signal that is different than the first orthogonal signal to obtain a second spread control signal, the second control channel format length being different than the first control channel format length; transmit, by the base station to the user device, a first resource grant indicating one or more resource blocks for uplink transmission, the first resource grant associated with or provided for the first uplink control information; and receive, by the base station from the user device, at least partially simultaneously via the one or more resource blocks, the first spread control signal and the second spread control signal.

Example 30. According to an example implementation, a method includes configuring, by a base station of a user device to: determine, by the user device in a wireless network, that a first uplink control information includes uplink data or uplink hybrid automatic repeat request (HARQ) feedback provided for a first data service type, the first uplink control information associated with a first control channel format length and provided for the first data service type; determine, by the user device, a second uplink control information associated with a second control channel format length and provided for a second data service type, the second control channel format length being different than the first control channel format length and the second data service type being different than the first data service type; and drop at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and receiving, by the base station from the user device, the second uplink control information, instead of the dropped portion of the first uplink control information during a first resource block.

Example 31. An apparatus comprising at least one processor and at least one memory including computer instructions, when executed by the at least one processor, cause the apparatus to: configure, by a base station of a user device to:

determine, by the user device in a wireless network, that a first uplink control information includes uplink data or uplink hybrid automatic repeat request (HARQ) feedback provided for a first data service type, the first uplink control information associated with a first control channel format length and provided for the first data service type; determine, by the user device, a second uplink control information associated with a second control channel format length and provided for a second data service type, the second control channel format length being different than the first control channel format length and the second data service type being different than the first data service type; and drop at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals; and receive, by the base station from the user device, the second uplink control information, instead of the dropped portion of the first uplink control information during a first resource block.

Example 32. An apparatus comprising at least one processor and at least one memory including computer instructions, when executed by the at least one processor, cause the apparatus to: multiplying, by a user device, a first uplink control information, associated with a first control channel format length, with a first orthogonal signal to obtain a first spread control signal, multiplying, by the user device, a second uplink control information, associated with a second control channel format length, with a second orthogonal signal that is different than the first orthogonal signal to obtain a second spread control signal, the second control channel format length being different than the first control channel format length, receiving, by the user device, a first resource grant indicating one or more resource blocks for uplink transmission, the first resource grant associated with or provided for the first uplink control information, and transmitting, by the user device, at least partially simultaneously via the one or more resource blocks, the first spread control signal and the second spread control signal.

Example 33. An apparatus comprising at least one processor and at least one memory including computer instructions, when executed by the at least one processor, cause the apparatus to: multiply, by a user device, a first uplink control information, associated with a first control channel format length and provided for a first data service type, with a first orthogonal signal to obtain a first spread control signal, multiply, by the user device, a second uplink control information, associated with a second control channel format length and provided for a second data service type, with a second orthogonal signal that is different than the first orthogonal signal to obtain a second spread control signal, the second control channel format length being different than the first control channel format length and the second data service type being different than the first data service type, and transmit, by the user device, at least partially simultaneously via one or more resource blocks, the first spread control signal and the second spread control signal.

Example 34. An apparatus comprising at least one processor and at least one memory including computer instructions, when executed by the at least one processor, cause the apparatus to: determine, by a user device in a wireless network, that a first uplink control information includes uplink data or uplink hybrid automatic repeat request (HARQ) feedback provided for a first data service type, the first uplink control information associated with a first control channel format length and provided for the first data service type, determine, by the user device, a second uplink control information associated with a second control channel format length and provided for a second data service type, the second control channel format length being different than the first control channel format length and the second data service type being different than the first data service type, drop at least a portion of the first uplink control information, that at least partially overlaps in time with at least a portion of the second uplink control information, the dropped portion of the first uplink control information including uplink data or uplink hybrid automatic repeat request (HARQ) feedback provided for the first data service type but not including demodulation reference signals, and transmitting the second uplink control information, instead of the dropped portion of the first uplink control information during a first resource block.

Figure 10:
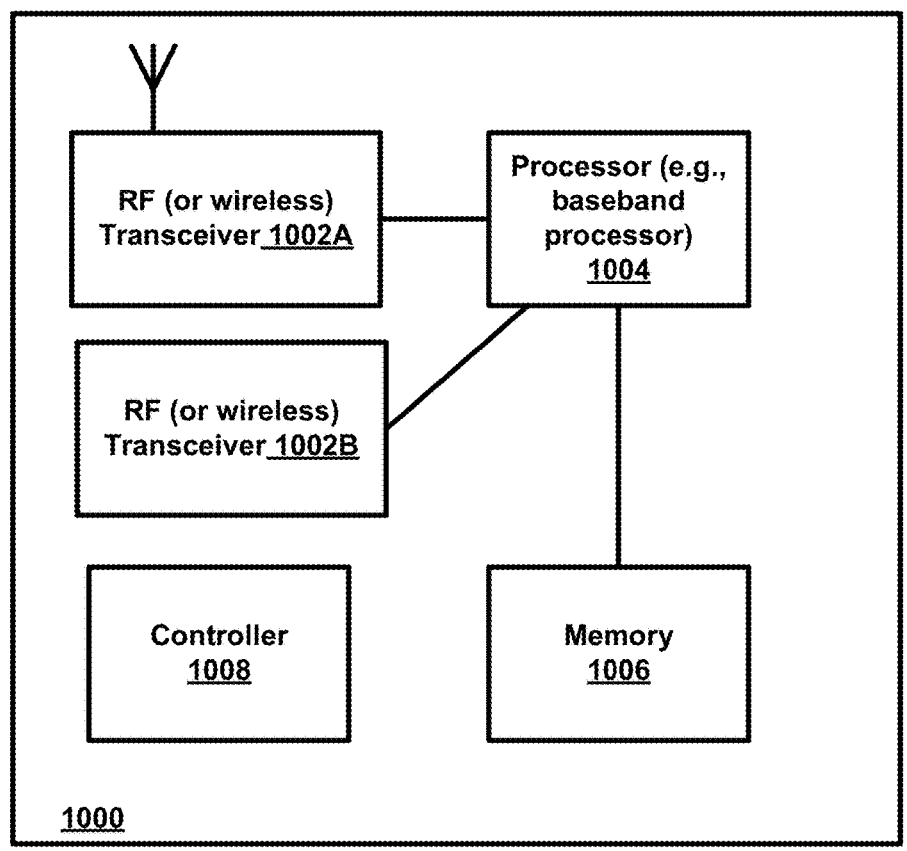
FIG. 10 is a block diagram of a node or wireless station (e.g., base station/access point or mobile station/user device) according to an example implementation.

FIG. 10 is a block diagram of a wireless station (e.g., AP, BS, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

HARQ Hybrid Automatic Repeat reQuest
(CA)ZAC (Constant Amplitude) Zero AutoCorrelation
ACK Acknowledgement
BW Bandwidth
gNB NR/5G Node B
CM Cubic metric
CP Cyclic Prefix
CS Cyclic Shift
CSI Channel state information
DCI Downlink Control Information
DFT-S-OFDM Discrete Fourier Transform Spread OFDM
DL Downlink
eMBB Enhanced Mobile Broadband
GP Guard Period
LTE Long Term Evolution
NR New Radio (5G)
OCC Orthogonal Cover Code
OFDM Orthogonal Frequency Division Multiplexing
PAPR Peak-to-average power ratio
PDCCH Physical Downlink Control Channel
PDSCH Physical Downlink Shared Channel
PRB Physical Resource Block
PUCCH Physical Uplink Control Channel
PUSCH Physical Uplink Shared Channel
QPSK Quadrature Phase Shift Keying
RF Radio Frequency
RS Reference Signal
SR Scheduling Request
SRS Sounding Reference Signal
TDD Time Division Duplexing
TDM Time Division Multiplexing
UCI Uplink Control Information
UE User Equipment
UL Uplink
URLLC Ultra-Reliable and Low-Latency Communications

What is claimed is:

1. A method of parallel transmission of uplink control information in a wireless network, comprising:
   multiplying, by a user device, a first uplink control information, associated with a first control channel format length and provided for an enhanced Mobile Broadband (eMBB) data service type, with a first orthogonal signal to obtain a first spread control signal;
   multiplying, by the user device, a second uplink control information, associated with a second control channel format length and provided for an ultra-reliable and low-latency communications (URLLC) data service type, with a second orthogonal signal that is different than the first orthogonal signal to obtain a second spread control signal, the second control channel format length being shorter than the first control channel format length; and
   receiving, by the user device, a first resource grant indicating one or more resource blocks for uplink transmission, the first resource grant associated with or provided for the first uplink control information; and
   transmitting, by the user device, at least partially simultaneously via the one or more resource blocks, the first spread control signal and the second spread control signal.

2. The method of claim 1, wherein the first spread control signal or the second spread control signal comprises demodulation reference signals for both the first uplink control information and the second uplink control information.

3. The method of claim and further comprising:
   performing, by the user device, symbol based frequency hopping for at least one of the first spread control signal and the second spread control signal.

4. The method of claim 1:
   wherein the first orthogonal signal comprises a first cyclical shift of a zero autocorrelation (ZAC) sequence; and
   wherein the second orthogonal signal comprises a second cyclical shift, different than the first cyclical shift, of the ZAC sequence.

5. The method of claim 1,
   wherein the first uplink control information comprises at least one of:
      hybrid automatic repeat request (HARQ) feedback for data of the eMBB data service type; and
      channel state information;
   wherein the second uplink control information comprises HARQ feedback for data of the URLLC data service type.

6. The method of claim 1, and further comprising:
   receiving, by the user device, a first resource grant indicating the one or more resource blocks for uplink transmission, the first resource grant associated with the first uplink control information and provided with respect to the eMBB data service type.

7. The method of claim 6, and further comprising:
   receiving, by the user device, a second resource grant indicating one or more additional resource blocks for uplink transmission, the second resource grant associated with the second uplink control information and provided with respect to the URLLC data service type, wherein the additional resource blocks indicated by the second resource grant are used for transmission of the second uplink control information when the first uplink control information is not present, and wherein at least a portion of the additional resource blocks indicated by the second resource grant are left unused when the first uplink control information is present.

8. The method of claim 1:
   wherein the multiplying the first uplink control information comprises multiplying the first uplink control information with a first cyclic shift of a zero autocorrelation (ZAC) sequence to obtain a first spread control signal; and
   wherein the multiplying the second uplink control information comprises multiplying a second uplink control information with a second cyclic shift, different from the first cyclic shift, of the zero autocorrelation (ZAC) sequence to obtain the second spread control signal.

9. The method of claim 8, wherein the first spread control signal provided for the eMBB data service type includes demodulation reference signals for both the eMBB data service type and the URLLC data service type.

10. The method of claim 1, and further comprises:
determining whether the first spread control signal includes demodulation reference signals; and
adjusting a transmission power of at least one of the first uplink control information and the second uplink control information based on whether the first spread control signal includes demodulation reference signals.

11. The method of claim 1, and further comprises:
determining that the first spread control signal does not include demodulation reference signals; and
adjusting, based on the determining, a transmission power of the first uplink control information to be less than a transmission power of the second uplink control information.

12. An apparatus comprising at least one processor and at least one memory including computer instructions, when executed by the at least one processor, cause the apparatus to perform the method of claim 1.

13. The apparatus of claim 12, wherein the first spread control signal or the second spread control signal comprises demodulation reference signals for both the first uplink control information and the second uplink control information.

14. The apparatus of claim 12, wherein the computer instructions, when executed by the at least one processor, further cause the apparatus to:
perform, by the user device, symbol based frequency hopping for at least one of the first spread control signal and the second spread control signal.

15. The apparatus of claim 12,
wherein the first uplink control information comprises at least one of:
hybrid automatic repeat request (HARQ) feedback for data of the eMBB data service type; and
channel state information;
wherein the second uplink control information comprises HARQ feedback for data of the URLLC data service type.

16. The apparatus of claim 12, wherein the computer instructions, when executed by the at least one processor, further cause the apparatus to:
receive, by the user device, a first resource grant indicating the one or more resource blocks for uplink transmission, the first resource grant associated with the first uplink control information and provided with respect to the eMBB data service type.

17. The apparatus of claim 16, wherein the computer instructions, when executed by the at least one processor, further cause the apparatus to:
receive, by the user device, a second resource grant indicating one or more additional resource blocks for uplink transmission, the second resource grant associated with the second uplink control information and provided with respect to the URLLC data service type, wherein the additional resource blocks indicated by the second resource grant are used for transmission of the second uplink control information when the first uplink control information is not present, and wherein at least a portion of the additional resource blocks indicated by the second resource grant are left unused when the first uplink control information is present.

18. The apparatus of claim 12:
wherein the multiplying the first uplink control information comprises multiplying the first uplink control information with a first cyclic shift of a zero autocorrelation (ZAC) sequence to obtain a first spread control signal; and
wherein the multiplying the second uplink control information comprises multiplying a second uplink control information with a second cyclic shift, different from the first cyclic shift, of the zero autocorrelation (ZAC) sequence to obtain the second spread control signal.

19. The apparatus of claim 12, wherein the computer instructions, when executed by the at least one processor, further cause the apparatus to:
determine whether the first spread control signal includes demodulation reference signals; and
adjust a transmission power of at least one of the first uplink control information and the second uplink control information based on whether the first spread control signal includes demodulation reference signals.

20. The apparatus of claim 12, wherein the computer instructions, when executed by the at least one processor, further cause the apparatus to:
determine that the first spread control signal does not include demodulation reference signals; and
adjust, based on the determining, a transmission power of the first uplink control information to be less than a transmission power of the second uplink control information.

* * * * *